US012627053B1

(12) United States Patent
Paschen et al.

(10) Patent No.: US 12,627,053 B1
(45) Date of Patent: May 12, 2026

(54) PATCH ANTENNA ELEMENT WITH REACTIVE AREAL LOADING

(71) Applicant: FIRST RF Corporation, Boulder, CO (US)

(72) Inventors: Dean Paschen, Superior, CO (US); Lars Grimsrud, Broomfield, CO (US)

(73) Assignee: FIRST RF Corporation, Boulder, CO (US)

( * ) Notice: Subject to any disclaimer, the term of this patent is extended or adjusted under 35 U.S.C. 154(b) by 552 days.

(21) Appl. No.: 17/723,946

(22) Filed: Apr. 19, 2022

Related U.S. Application Data

(60) Provisional application No. 63/176,802, filed on Apr. 19, 2021.

(51) Int. Cl.
*H01Q 9/04* (2006.01)
*H01Q 1/48* (2006.01)
*H01Q 25/00* (2006.01)

(52) U.S. Cl.
CPC ............ *H01Q 9/0407* (2013.01); *H01Q 1/48* (2013.01); *H01Q 25/001* (2013.01)

(58) Field of Classification Search
CPC ............ H01Q 1/38-48; H01Q 9/0407; H01Q 21/065; H01Q 15/008
See application file for complete search history.

(56) References Cited

U.S. PATENT DOCUMENTS 6,674,406 B1 1/2004 Tonn
6,882,316 B2 4/2005 McKinzie, III et al.
7,079,079 B2 * 7/2006 Jo ........................ H01Q 9/0442 343/702
7,623,087 B2 * 11/2009 Higaki ................. H01Q 15/008 343/702
7,626,216 B2 * 12/2009 McKinzie, III ...... H05K 1/0233 257/532
8,077,092 B2 12/2011 Coupez et al.
10,446,923 B2 * 10/2019 Watson ................ H01Q 21/065
11,024,952 B1 * 6/2021 Quarfoth ................ H01Q 1/364
2007/0052590 A1 3/2007 Chang et al.
(Continued)

OTHER PUBLICATIONS

Chang, T-H. et al. "Mesh Antennas With Reduced Size" IEEE Antennas and Propagation Society Symposium, vol. 4; 2004, pp. 3832-3835.

*Primary Examiner* — Hasan Islam
(74) *Attorney, Agent, or Firm* — Cozen O'Connor

(57) ABSTRACT

A patch antenna element has a plurality of patches that are coplanar, each having a length along a resonant dimension that is no greater than one-quarter of a wavelength of a maximum operating frequency of the patch antenna element. The antenna element also includes one or more discrete reactive elements. For each pair of neighboring patches of the plurality of patches, the pair forms an electrically insulating space therebetween. At least one discrete reactive element lies within the electrically insulating space and is electrically connected to both of the neighboring patches of the pair. A patch antenna combines the patch antenna element with a counterpoise that is parallel to, and displaced from, the patch antenna element. Each discrete reactive element may be an inductor or capacitor, either planar or non-planar. The patch antenna may be configured as a dual-polarization patch antenna or quarter-wave patch antenna.

17 Claims, 19 Drawing Sheets

(56) References Cited

U.S. PATENT DOCUMENTS

2015/0244079 A1* 8/2015 White ................ H01Q 15/0013
343/913
2017/0069967 A1* 3/2017 Shrekenhamer ......... H01Q 1/28
2023/0128565 A1* 4/2023 Yoshikawa ............ H01Q 21/24
343/872

* cited by examiner

PATCH ANTENNA ELEMENT WITH REACTIVE AREAL LOADING

RELATED APPLICATIONS

This application claims priority to U.S. Provisional Patent Application 63/176,802, filed Apr. 19, 2021, which is incorporated herein by reference in its entirety.

BACKGROUND

The characteristic impedance Z(ω) of an infinitely-long transmission line is the ratio of the voltage to the current of a sinusoidal wave of frequency ω travelling along the transmission line. Since the transmission line is infinitely-long, the sinusoidal wave will not produce any reflections. It is frequently assumed that the transmission line has no series resistance (per unit length) and infinite shunt resistance (also per unit length). In this case, the characteristic impedance is essentially independent of frequency (i.e., $Z(\omega)\approx Z_0$, where $Z_0$ is a constant) and independent of length. Thus, the characteristic impedance $Z_0$ also applies to finite-length sections of the transmission line. Common values of $Z_0$ include 50Ω (e.g., RG-58 coaxial cable), 7502 (e.g., RG-6 coaxial cable), 900 (e.g., USB), and 1000 (e.g., Ethernet).

SUMMARY

Disclosed herein are techniques that use discrete reactive elements (i.e., capacitors and inductors) to increase the impedance of a transmission line. These techniques are particularly useful for planar transmission lines (e.g., microstrip, stripline, coplanar waveguide, etc.), where the characteristic impedance $Z_0$ increases as the effective width $w_{eff}$ of the strip decreases. Due to limitations in processing and manufacturing (e.g., printed circuit boards, lithography, etc.), there is a smallest effective width $w_{eff}$ that can be reliably and repeatedly fabricated. This smallest effective width $w_{eff}$ limits the characteristic impedance $Z_0$ to typically less than a couple hundred ohms. However, for many applications, it would be advantageous (e.g., less insertion loss, higher bandwidth, improved energy efficiency, reduced component count, etc.) to fabricate higher-impedance planar transmission lines. The impedance-increasing techniques disclosed herein are also applicable to other types of transmission lines, such as coaxial and twisted-pair.

In some embodiments, a high-impedance transmission line includes a sequence of transmission-line segments, each having a characteristic impedance $Z_0$. These segments are disjoint in that their signal conductors do not make direct electrical contact with each other. Each segment has a length (along a transmission direction) that is no greater than $\lambda_{max}/2$, where $\lambda_{max}$ is the maximum wavelength of a maximum operating frequency $f_{max}$ of the high-impedance transmission line. At least one discrete reactive element or component electrically connects each segment to its nearest neighbor. The reactive elements may be planar (e.g., a planar capacitor or inductor), in which case they may be fabricated simultaneously with planar transmission-line segments. Alternatively, the reactive elements may be non-planar (e.g., a helical coil, surface-mount component, etc.). These reactive elements are "discrete" to differentiate them from the continuously-distributed properties of the transmission-line segments.

Advantageously, the plurality of transmission-line segments may be fabricated using conventional techniques, and therefore may have a relatively low characteristic impedance $Z_0$ (e.g., 500 or 75Ω). Accordingly, planar implementations of the high-impedance transmission line can utilize the same techniques currently used to fabricate planar transmission lines. The discrete reactive elements are selected such that the high-impedance transmission line has a characteristic impedance $Z_0'$ that is greater than $Z_0$. In many of the present embodiments, the reactive elements are inductors. The self-resonant frequencies of these inductors may be close to, or exceed, the maximum operating frequency $f_{max}$. However, one or more of the discrete reactive elements may be a capacitor. More generally, the discrete reactive elements can be any combination of inductors and capacitors.

Microstrip patch antennas are devices whose performance can be improved using the impedance-increasing techniques described herein. For example, consider a conventional half-wave patch antenna having a single patch of length $l\approx\lambda_c/2$, where $\lambda_c$ is the wavelength of a resonant frequency $f_c$ of the patch antenna. The single patch is located over a counterpoise that is parallel to the single patch and vertically displaced from the counterpoise by a small gap. This patch antenna can be modeled as a transmission line of length l and characteristic impedance $Z_0$. The two lengthwise radiating edges can be modeled as radiation resistances R that load both ends of the modeled transmission line. Typically R is at least ten times greater than $Z_0$. Due to this impedance mismatch, the reflectivities of the electrical signal at the radiating edges are large, i.e., the patch antenna has a large Q, which results in low electrical efficiency and small bandwidth.

To improve the performance of the conventional patch antenna, the single patch can be replaced by a sequence of coplanar patches. Each of these patches has a length less than $\lambda_{max}/2$, where Amax is the wavelength of a maximum operating frequency of the patch antenna, and cooperates with an underlying counterpoise to act like a transmission-line segment having a characteristic impedance $Z_0$. The patches are disjoint, i.e., spaced apart such that each patch creates an electrically insulating space with each of its neighbors. Located within each space is at least one discrete reactive component that electrically connects to both of the patches forming the space. These discrete reactive components may be planar inductors or planar capacitors that are coplanar with the patches. Alternatively, these discrete reactive components may be non-planar (e.g., surface-mount components soldered to the patches). The type, number, values, and locations of these discrete reactive components are selected such that the resulting characteristic impedance $Z_0'$ of the sequence of coplanar patches is greater than $Z_0$.

The use of discrete reactive elements between the radiating edges of the half-wavelength patch antenna is referred to herein as areal loading. In addition to improved efficiency and higher bandwidth, the areal-loaded patch antennas of the present embodiments also have smaller footprints than their non-areal-loaded counterparts. However, these smaller footprints advantageously come with higher bandwidth. By contrast, reducing patch-antenna footprint by bulk-loading a conventional patch antenna with a dielectric material having a high relative permittivity $\epsilon_r$ causes the bandwidth to decrease. Areal loading can be combined with other footprint-reducing techniques known in the art (including, but not limited to, bulk loading).

Furthermore, the increased characteristic impedance $Z_0'$ of an areal-loaded patch antenna has no impact on how it is impedance-matched to a feed line. For example, when the half-wavelength areal-loaded patch antenna is fed midway between its radiating edges, it will appear to the feed line as a 0-Ω load. When this patch antenna is fed at one of the radiating edges, it will appear to the feed line as a load of R/2. Thus, just like a conventional half-wavelength patch antenna, an areal-loaded patch antenna can be impedance-matched to a feed line by adjusting how close the feed line connects to a radiating edge.

In addition to the above example of a half-wavelength patch antenna, areal loading can also be used to improve other types of patch antennas. Examples include, but are not limited to, quarter-wavelength patch antennas (e.g., a planar inverted-F antenna) and dual-polarization patch antennas. Furthermore, the areal-loaded sequences of patches described herein can also be used as frequency-selective surfaces, and therefore may be used without a counterpoise, ground plane, or shielding.

DETAILED DESCRIPTION

Figure 1:
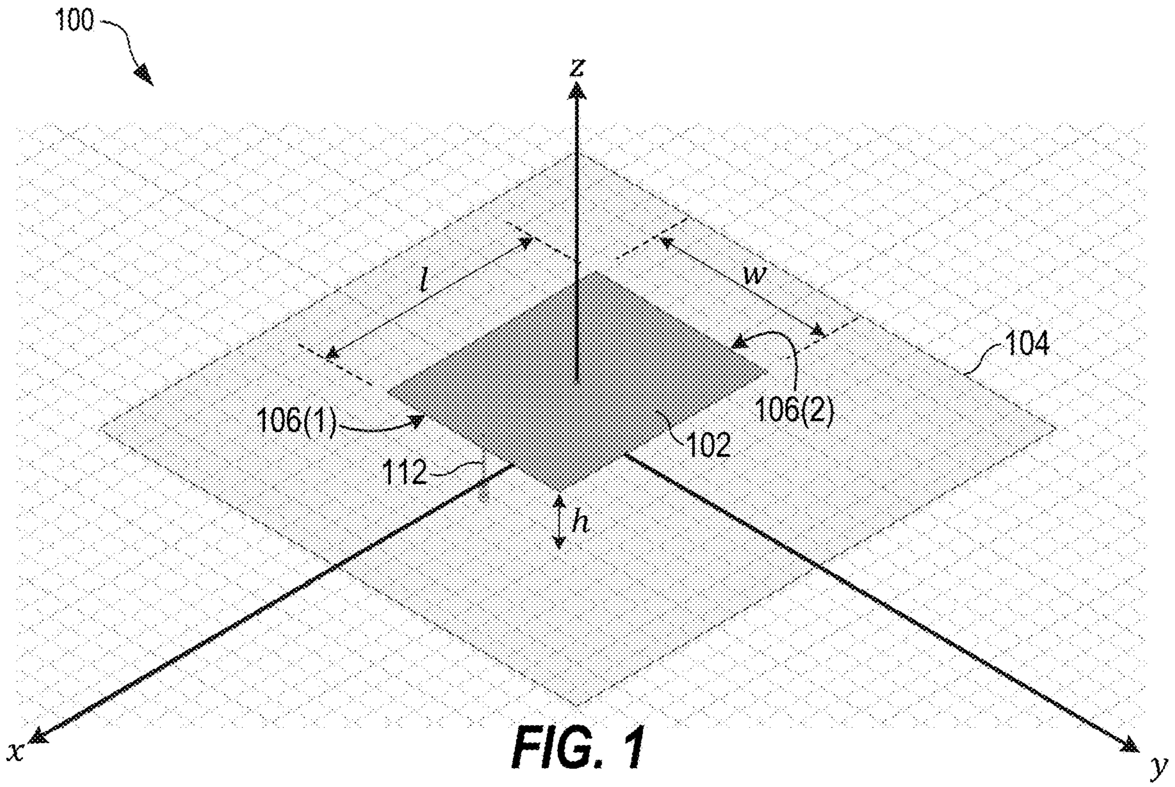
FIG. 1 (PRIOR ART)
FIG. 1 is a perspective view of a conventional air-loaded microstrip patch antenna.

FIG. 1 is a perspective view of a conventional air-loaded microstrip patch antenna 100. The patch antenna 100 includes a planar patch 102 that is shaped as a rectangle and lies flat in the x-y plane. The patch 102 has a first radiating edge 106(1) and second radiating edge 106(2) that are separated along x by a length l. The patch 102 also has a width w along y. Thus, the length l is the resonant dimension of the patch antenna 100. The patch antenna 100 also includes a planar counterpoise 104; the patch 102 is vertically displaced (i.e., in the +z direction) from the counterpoise 104 by a gap height h. For clarity in FIG. 1, the origin of the x-y-z coordinate system is located at the center of the counterpoise 104 along x and y, and therefore the patch 102 lies in the plane z=+h. The patch 102 also includes a feed 112.

Each of the patch 102 and counterpoise 104 may be formed from metal (e.g., copper, aluminum, silver, etc.) or another type of electrically conductive material (e.g., high-conductivity silicon). The patch antenna 100 is "air-loaded" in that air, with a relative permittivity $\epsilon_r \approx 1.0006$, fills the space between the patch 102 and the counterpoise 104. Alternatively, another gas whose relative permittivity is close to 1 may fill this space, or the space may be a vacuum ($\epsilon_r = 1$). The length l is typically slightly less than $\lambda_0/2$, where $\lambda_0$ is the wavelength corresponding to the fundamental resonant frequency of the patch antenna 100.

Figure 2:
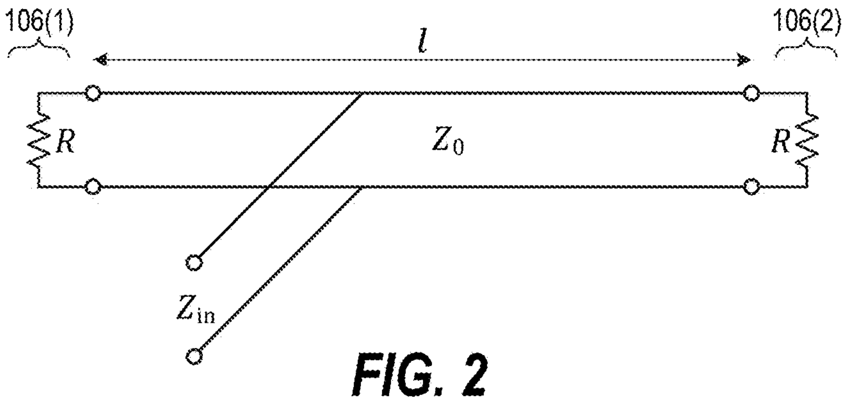
FIG. 2 shows a transmission-line model of the patch antenna of FIG. 1.

FIG. 2 shows a transmission-line model of the patch antenna 100 of FIG. 1. The patch 102 may be thought of as a microstrip transmission line having a length l, a characteristic impedance $$Z_0 \propto \sqrt{\mu_r/\epsilon_r}, \tag{1}$$

And a Phase Constant $$\beta \propto \sqrt{\mu_r \epsilon_r}, \tag{2}$$

where $\mu_r$ is the relative permeability and $\epsilon_r$ is the relative permittivity of the material bulk-loading the patch antenna 100 (i.e., filling the space between the patch 102 and counterpoise 104). To minimize reflections, the patch antenna 100 is typically designed such that the characteristic impedance $Z_0$ matches the input impedance $Z_{in}$ of the feed 112 (e.g., 5012). The radiation of electromagnetic energy from the radiating edges 106(1) and 106(2) is modeled as a radiation resistance $R=90\ (\lambda_0/w)^2$, assuming that $w \ll \lambda_0$. Thus, the radiation resistance R is typically much higher than the characteristic impedance $Z_0$. This mismatch between R and $Z_0$ is a key reason why microstrip antennas generally have smaller impedance bandwidths than higher-profile antennas (e.g., a dipole antenna).

Figure 3:
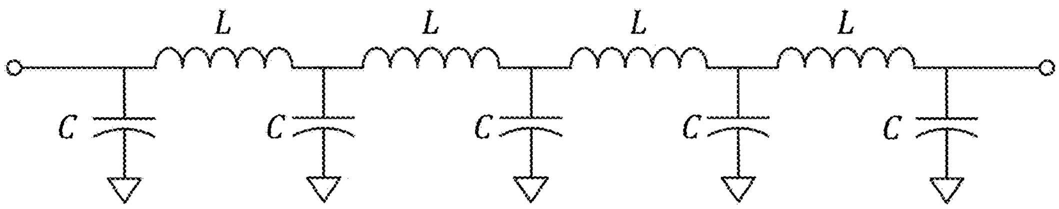
FIG. 3 shows a lumped-element transmission-line model of the patch antenna of FIG. 1.

FIG. 3 shows a lumped-element transmission-line model of the patch antenna 100 of FIG. 1. For clarity, the radiation resistance R is not shown. According to this model, the microstrip transmission line has a characteristic impedance $$Z_0 \propto \sqrt{L/C} \tag{3}$$

And Phase Constant $$\beta \propto \sqrt{LC}. \tag{4}$$

Comparing Eqns. 1 and 3, and Eqns. 2 and 4, shows that the relative permeability $\mu_r$ acts similarly to the inductance L and the relative permittivity $\epsilon_r$ acts similarly to the capacitance C.

Figure 4:
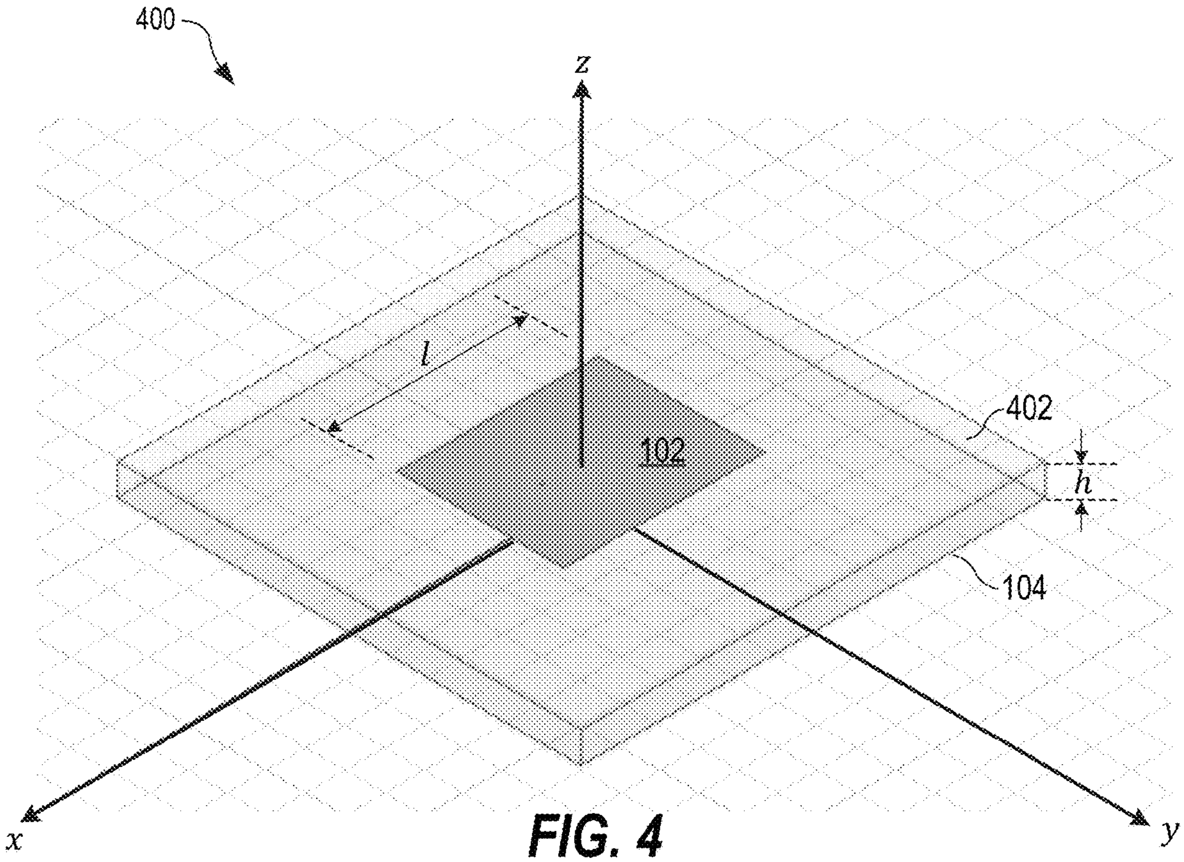
FIG. 4 (PRIOR ART)
FIG. 4 is a perspective view of a dielectric-loaded microstrip patch antenna that is similar to the air-loaded microstrip patch antenna of FIG. 1 except that it includes a dielectric material, in an embodiment.

FIG. 4 is a perspective view of a dielectric-loaded microstrip patch antenna 400 that is similar to the air-loaded microstrip patch antenna 100 of FIG. 1 except that a dielectric material 402 having a relative permittivity $\epsilon_r$ fills the space between the patch 102 and counterpoise 104. When this space is filled with a dielectric material, it is referred to herein as "bulk loaded". The dielectric material 402 has a height of approximately h, ignoring the thicknesses along z of the patch 102 and counterpoise 104. The bulk-dielectric loading shown in FIG. 4 is one technique used to reduce the length l of a patch antenna. Mathematically, the length l is given by $$l = \frac{\lambda_0}{2\sqrt{\epsilon_{r,eff}}} - 2\Delta l,$$

where $\epsilon_{r,eff}$ is the effective relative permittivity and Δl accounts for the fringing fields near the radiating edges 106(1) and 106(2). Thus, a larger value of $\epsilon_{r,eff}$ results in a smaller antenna. However, a larger value of $\epsilon_{r,eff}$ reduces the characteristic impedance $Z_0$, further increasing the mismatch between $Z_0$ and R and therefore reducing the bandwidth of the patch antenna 400. The impedance bandwidth BW (at a VSWR of 2.0:1) of the patch antenna 400 can be estimated by $$BW \approx \frac{2.66\ \text{h}}{\lambda_0\sqrt{\epsilon_r}} \times 100\%,$$

which shows that the bandwidth BW increases with the gap height h and decreases with larger values of the relative permittivity $\epsilon_r$.

Figure 5:
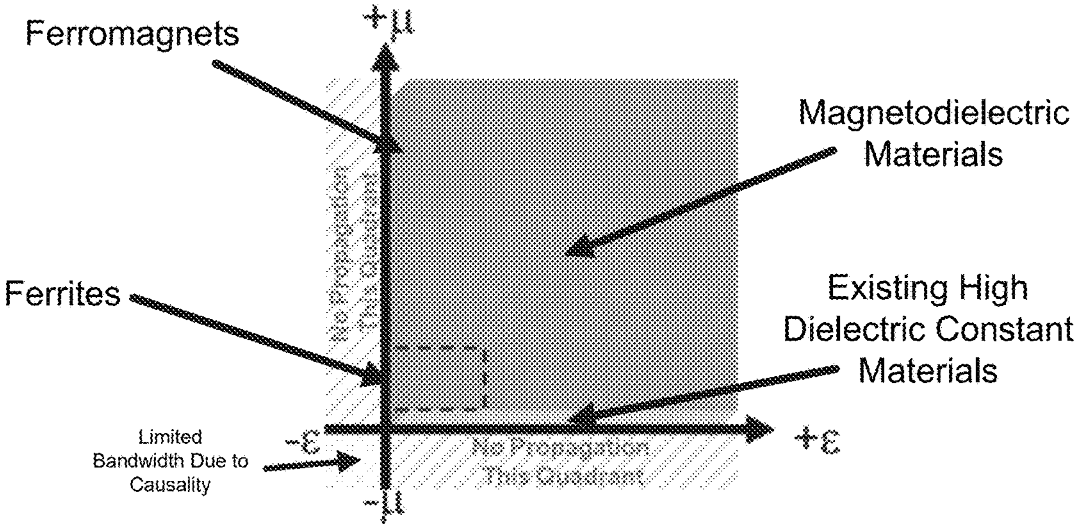
FIG. 5 is a plot illustrating how a patch antenna can be bulk-loaded with various magnetodielectric materials, in embodiments.

FIG. 5 is a plot illustrating how a patch antenna can be bulk-loaded with various magnetodielectric materials. Only adjusting the relative permittivity $\epsilon_r$ restricts the choice of loading material (e.g., the dielectric material 402) to those lying close to the +x axis. However, materials with higher magnetic permeabilities μ can also be used to load a patch antenna. In fact, it has been shown that the length l of a patch antenna can be reduced by loading it with a material having a higher relative permittivity Er, a higher relative permeability $\mu_r$, or both. However, a higher relative permeability $\mu_r$ increases the characteristic impedance $Z_0$, advantageously improving bandwidth. Indeed, it can be shown that for a rectangular patch antenna of constant width w whose length l is decreased as the relative permeability $\mu_r$ of the loading material increases, the bandwidth BW increases as the square root of the effective relative permeability.

As an alternative to bulk loading, the size of a patch antenna can be reduced by incorporating lumped-element components. For example, and as shown in many of the present embodiments, lumped-element inductors and capacitors can be created using the same printed-circuit board and photolithography techniques already used to fabricate antenna patches. Alternatively, discrete components (e.g., surface-mount capacitors and inductors) can be directly soldered to metal forming an antenna patch. As an example, and as suggested by comparing Eqns. 1 and 3 and Eqns. 2 and 4, the addition of shunted lumped-element capacitors is generally equivalent to the bulk-dielectric loading shown in FIG. 4 in that these shunt capacitors also reduce the size of the patch 102, the characteristic impedance $Z_0$, and the impedance bandwidth BW. However, unlike bulk-dielectric loading, shunt capacitances can be separately tuned and individually placed in target locations of the patch 102.

Figure 6A:
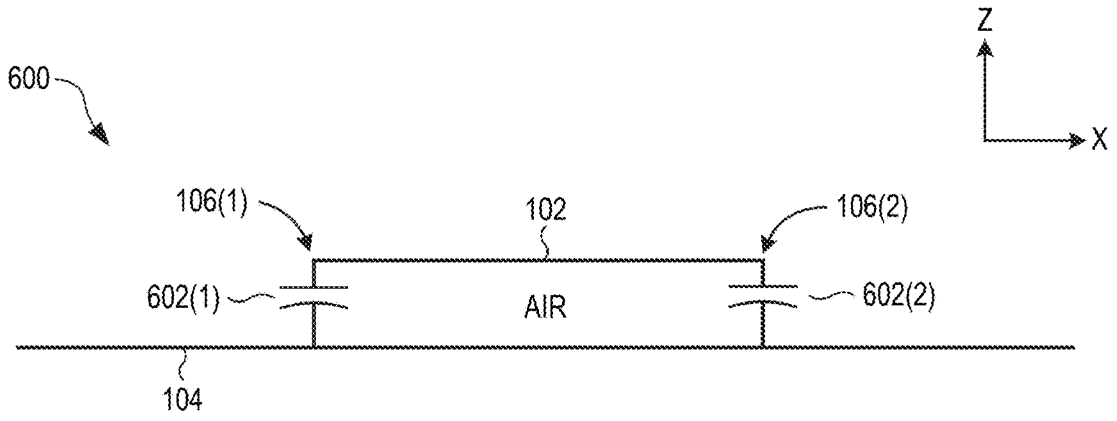
FIG. 6A is a side view of a capacitively-shunted air-loaded patch antenna that is similar to the patch antenna of FIG. 1 except that it includes discrete shunting capacitors, in an embodiment.
Figure 6B:
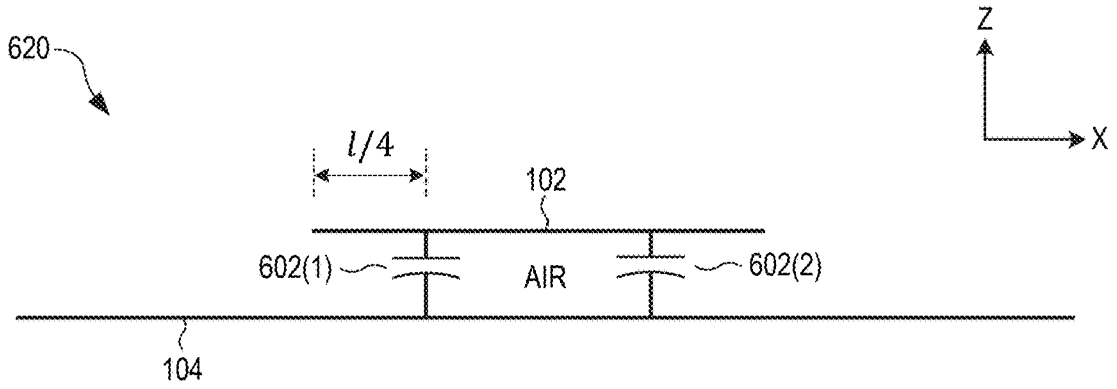
FIG. 6B is a side view of a capacitively-shunted air-loaded patch antenna that is similar to the patch antenna of FIG. 6A except that the discrete shunting capacitors are located halfway to the center of the patch, in an embodiment.
Figure 6C:
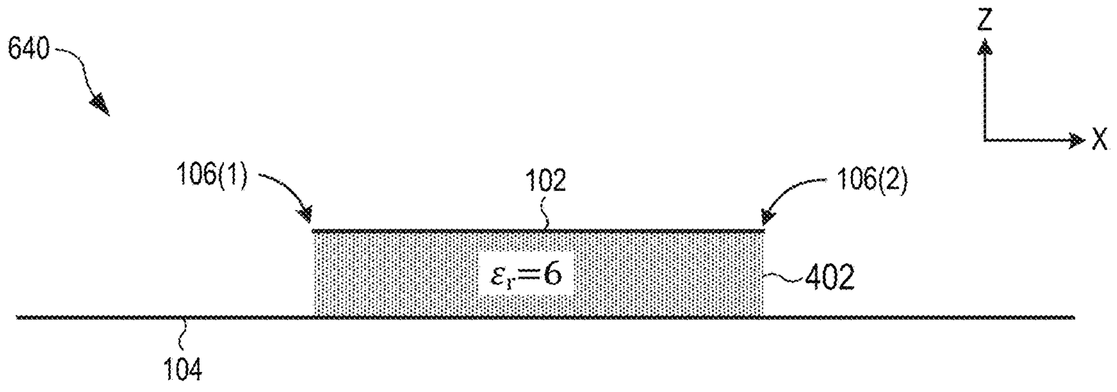
FIG. 6C is a side view of a dielectric-loaded patch antenna that is similar to the patch antenna of FIG. 4 except that the dielectric material does not extend past the radiating edges, in an embodiment.

FIG. 6A is a side view of a capacitively-shunted air-loaded patch antenna 600 that is similar to the patch antenna 100 of FIG. 1 except that it includes a first discrete capacitor 602(1) that shunts the patch 102 to the underlying counterpoise 104 at the first radiating edge 106(1). The patch antenna 600 also includes a second discrete capacitor 602(2) that shunts the patch 102 to the counterpoise 104 at the second radiating edge 106(2). FIG. 6B is a side view of a capacitively-shunted air-loaded patch antenna 620 that is similar to the patch antenna 600 except that the capacitors 602(1) and 602(2) are located halfway to the center of the patch 102. FIG. 6C is a side view of a dielectric-loaded patch antenna 640 that is similar to the patch antenna 400 of FIG. 4 except that the dielectric material 402 does not extend past the radiating edges 106(1) and 106(2) along x. It is assumed in the following discussion that the dielectric material 402 has a relative permittivity of $\epsilon_r=6$.

Figure 7:
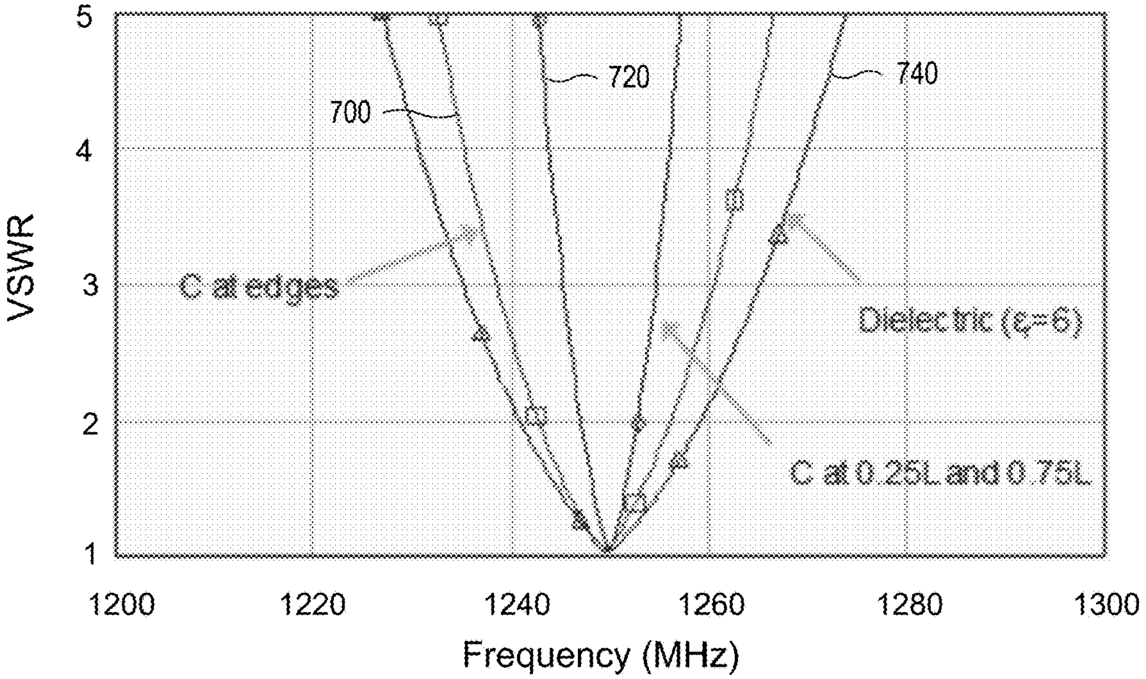
FIG. 7 is a plot of the voltage standing-wave ratio (VSWR) simulated for the capacitively-shunted air-loaded patch antenna of FIG. 6A, the capacitively-shunted air-loaded patch antenna of FIG. 6B, and the dielectric-loaded patch antenna of FIG. 6C.

FIG. 7 is a plot of the voltage standing-wave ratio (VSWR) simulated for the capacitively-shunted air-loaded patch antenna 600 of FIG. 6A (see the curve 700), the capacitively-shunted air-loaded patch antenna 620 of FIG. 6B (see the curve 720), and the dielectric-loaded patch antenna 640 of FIG. 6C (see the curve 740). FIG. 7 illustrates how the capacitors 602(1) and 602(2) can be used to load the air-loaded patch antenna 100 to replicate the behavior of the dielectric-loaded patch antenna 400. The capacitors 602(1) and 602(2) reduce the impedance bandwidth BW. As indicated by the curves 700 and 720, placing the capacitors 602(1) and 602(2) closer to the radiating edges 106(1) and 106(2) increases the impedance bandwidth BW. In fact, the bandwidth BW of the curve 700 is almost as wide as that of the curve 740, yet the air-loaded patch antenna 600 is lighter and less expensive than the bulk-dielectric-loaded patch antenna 640 because it does not include the dielectric material 402.

To test the simulations in FIG. 6, prototypes of the patch antennas 600 and 640 were constructed and experimentally tested. For the prototype of the patch antenna 600, the capacitors 602(1) and 602(2) were created from metal standoffs that were conductively attached to the counterpoise 104 and vertically spaced from the patch 102 by the 0.01" thickness of a FR-4 circuit board supporting the patch 102. The nominal capacitance of each of the capacitors 602(1) and 602(2) was 2 pF. Instead of impedance-matching the prototype of the patch antenna 600 to $Z_{in}=50\Omega$ by moving the feed point along x (see the feed 112 in FIG. 1), the feed point was fixed while the capacitors 602(1) and 602(2) were moved along x to provide more loading on one of the radiating edges 106(1) and 106(2) than the other. For the prototype of the patch antenna 640, the dielectric material 402 was Rogers TMM6 laminate.

Figure 8:
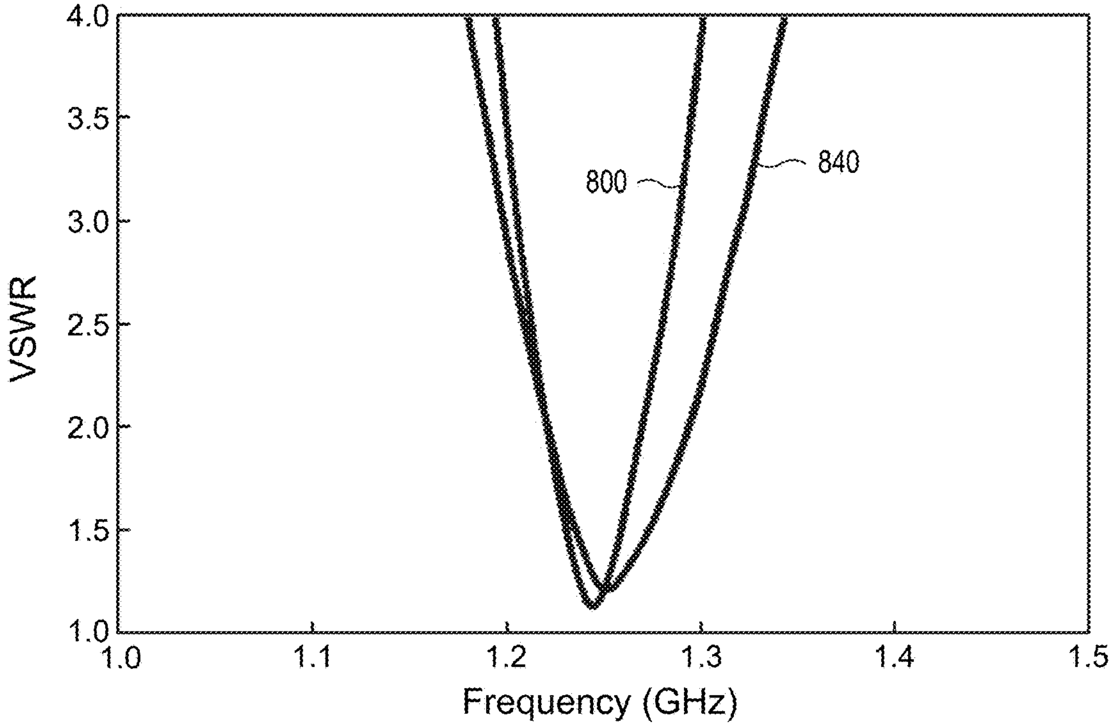
FIG. 8 is a plot of the VSWR measured with a prototype of the capacitively-shunted air-loaded patch antenna of FIG. 6A and a prototype of the dielectric-loaded patch antenna of FIG. 6C.

FIG. 8 is a plot of the VSWR measured with the prototype of the capacitively-shunted air-loaded patch antenna 600 (see the curve 800) and the prototype of the dielectric-loaded patch antenna 640 (see the curve 840). The impedance bandwidth BW of the capacitively-shunted air-loaded patch antenna 600 is about 70% of that of the dielectric-loaded patch antenna 640, similar to what was simulated in FIG. 7.

Figure 9:
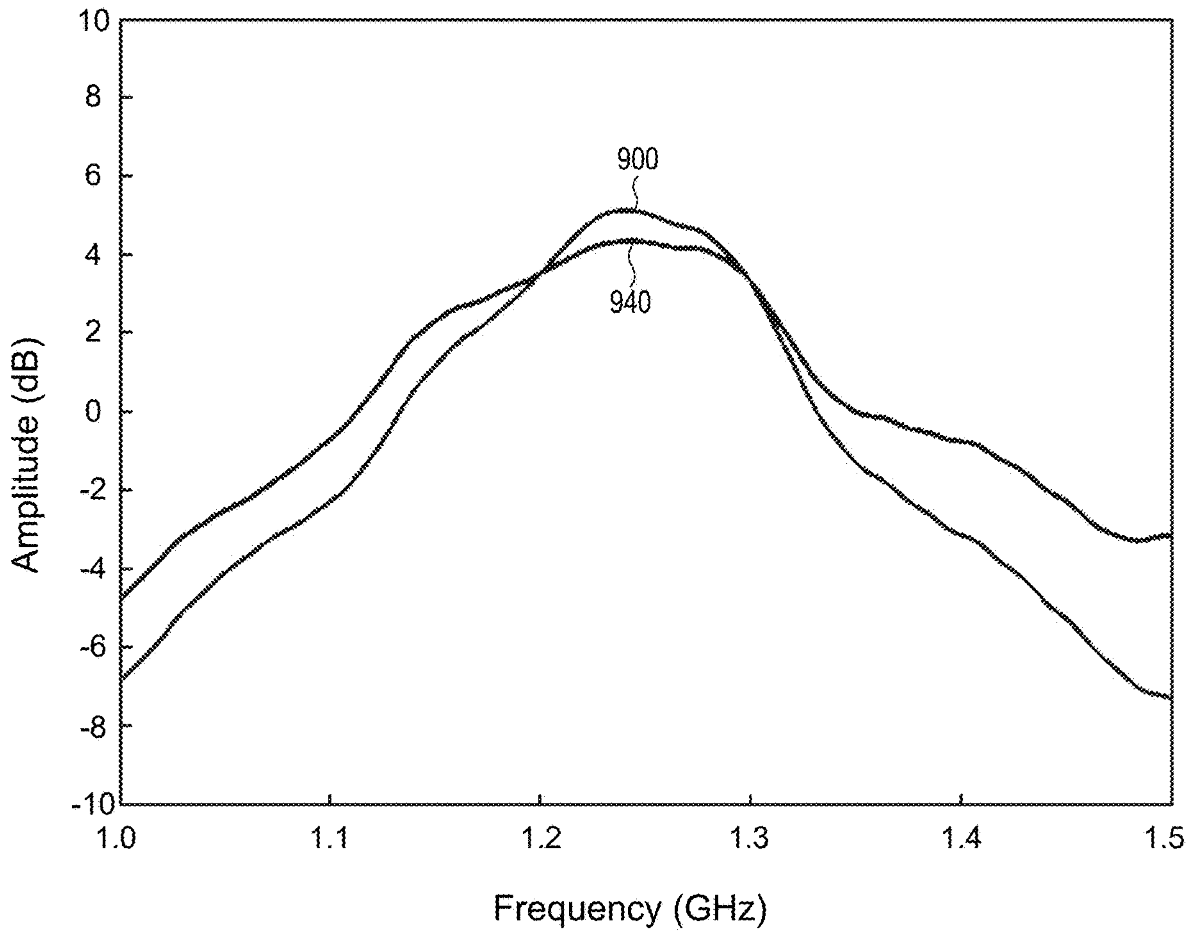
FIG. 9 is a plot of the swept boresight gain measured with the prototype of the capacitively-shunted air-loaded patch antenna of FIG. 6A and the prototype of the dielectric-loaded patch antenna of FIG. 6C.

FIG. 9 is a plot of the swept boresight gain measured with the prototype of the capacitively-shunted air-loaded patch antenna 600 (see the curve 900) and the prototype of the dielectric-loaded patch antenna 640 (see the curve 940). The capacitively-shunted air-loaded patch antenna 600 has higher gain in the passband than the dielectric-loaded patch antenna 640.

The capacitively-shunted air-loaded patch antenna 600 has less mass and cost than the dielectric-loaded patch antenna 640. The mass of just the dielectric material 402 directly under the footprint of the patch 102 (i.e., without extending in the x-y plane to the edges of the counterpoise 104, as shown in FIG. 6C) is 62.9 g. By comparison, the spacers used to make the capacitors 602(1) and 602(2) have a mass of only 0.005 g, a reduction of four orders of magnitude. The unit cost of the dielectric material 402 is $8.50, assuming high-volume pricing. By comparison, the cost of fabricating the metal spacers is only $0.25.

While FIGS. 6A and 6B show only the two discrete capacitors 602(1) and 602(2), additional capacitors may be used to load the patch antennas 600 and 620 without departing from the scope hereof. For example, additional capacitors can be placed linearly along the width dimension (i.e., along y) to increase the shunt capacitance. Furthermore, it is not necessary that the capacitors 602(1) and 602(2) have the same nominal capacitance. Similarly, it is not necessary that the capacitors 602(1) and 602(2) be placed symmetrical about the center of the patch 102 (as described above for impedance matching). In some embodiments, a patch antenna is loaded with both discrete capacitors and the dielectric material 402.

Figure 10:
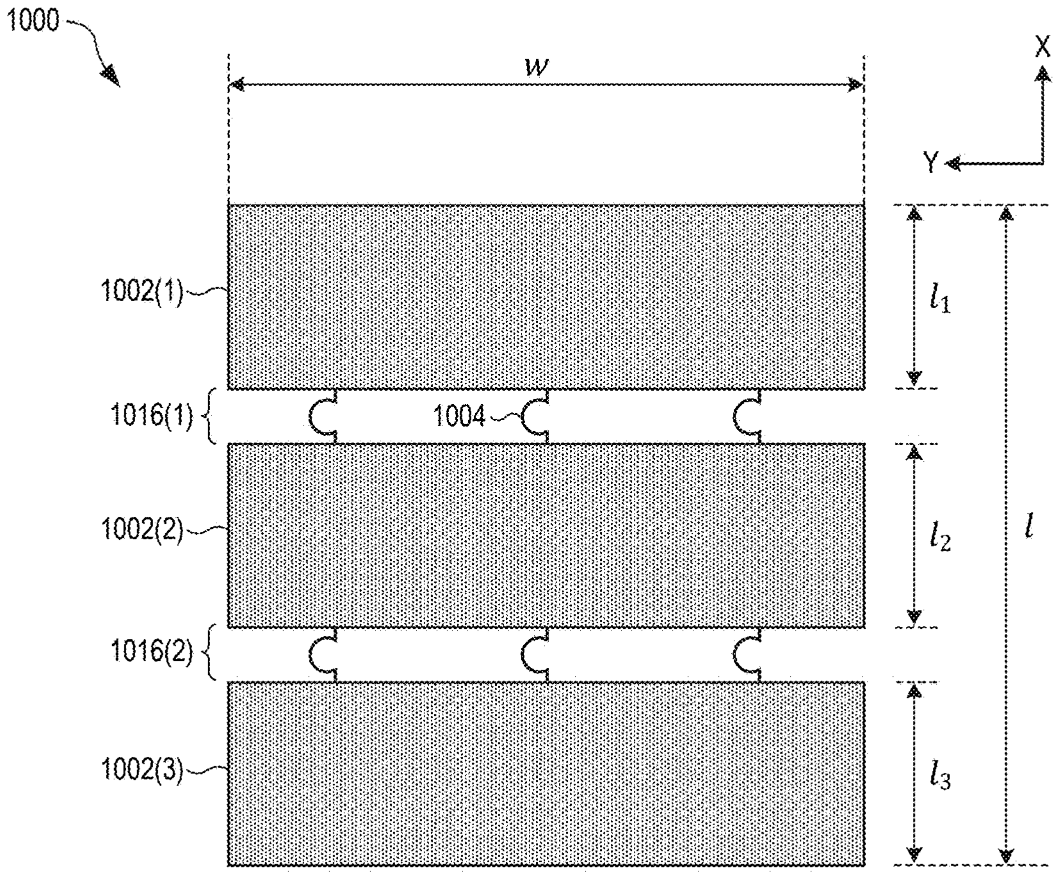
FIG. 10 is a top view of an antenna element having a first patch, a second patch, a third patch, and reactive elements, in embodiments.
Figure 11:
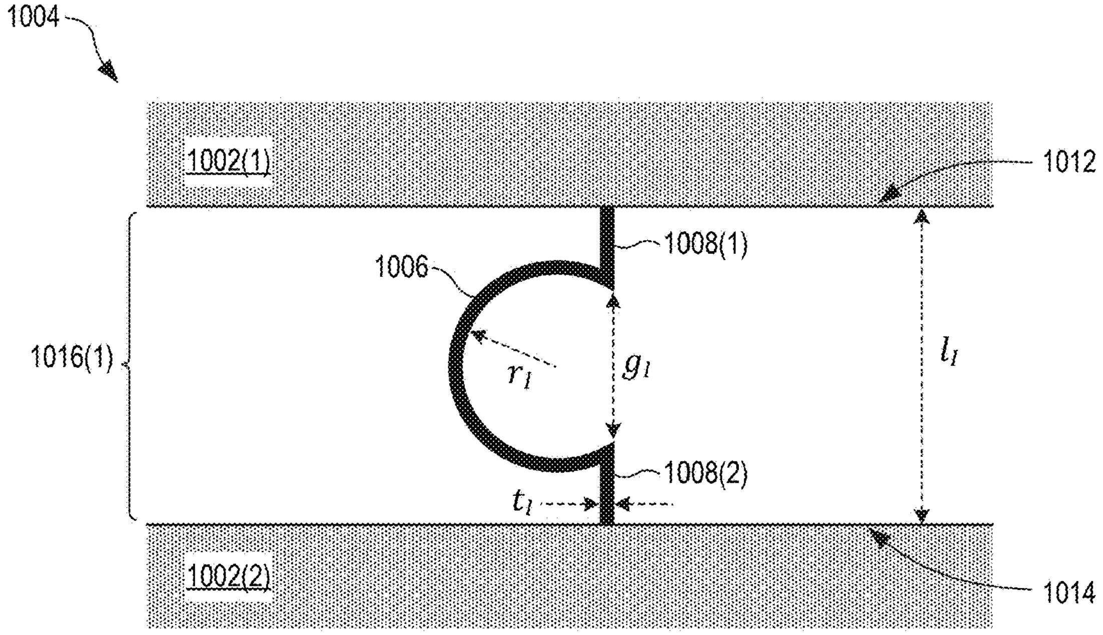
FIG. 11 is an expanded view of one of the reactive elements shown in FIG. 10, in an embodiment.

FIG. 10 is a top view of an antenna element 1000 having a first patch 1002(1), a second patch 1002(2), a third patch 1002(3), and discrete reactive elements 1004. For clarity in FIG. 10, only one of the discrete reactive elements 1004 is labeled. FIG. 11 is an expanded view of one of the discrete reactive elements 1004. FIGS. 10 and 11 are best viewed together with the following description.

Formed from electrically conductive material (e.g., metal, electrically conductive silicon, etc.), the patches 1002(1), 1002(2), and 1002(3) are coplanar (i.e., lying in the same x-y plane) and spaced apart from each other such that each patch 1002 creates one or more electrically insulating spaces 1016 with its nearest-neighbor patches 1002. Two patches 1002 are described herein as "nearest neighbors", "nearest-neighbor patches", or "a nearest-neighbor pair" when they form a space 1016 therebetween and no other patch 1002 lies between them. Thus, in the example of FIG. 10, the patches 1002(1) and 1002(2) are nearest neighbors since they form the first space 1016(1) and no other patch 1002 is located in between them. Similarly, the patches 1002(2) and 1002(3) are nearest neighbors since they form the second space 1016(2) and no other patch 1002 is located in between them. By contrast, the patches 1002(1) and 1002(3) are not nearest neighbors because the patch 1002(2) lies between them.

In FIG. 10, three reactive elements 1004 electrically connect the patches 1002(1) and 1002(2) together. Similarly, three reactive elements 1004 electrically connect the patches 1002(2) and 1002(3) together. The reactive elements 1004 may be planar and therefore coplanar with the patches 1002(1), 1002(2), and 1002(3). The reactive elements 1004 are formed from electrically conductive material, which may be the same electrically conductive material used for the patches 1002(1), 1002(2), and 1002(3) (e.g., metal). As shown in FIG. 10, the reactive elements 1004 lie in the electrically insulating space 1016 formed by a nearest-neighbor pair of patches 1002. Each reactive element 1004 is a two-leaded discrete component in which one lead electrically connects to one patch of the nearest-neighbor pair while the second lead electrically connects to the other patch of the nearest-neighbor pair.

As shown in FIGS. 10 and 11, each reactive element 1004 is a planar inductor that is coplanar with the patches 1002(1), 1002(2), and 1002(3) and shaped as a partial circular loop 1006 with ends joined (i.e., electrically shorted) to a first lead 1008(1) and a second lead 1008(2). The first lead 1008(1) electrically connects to the first patch 1002(1) and the second lead 1008(2) electrically connects to the second patch 1002(2). The circular loop 1006 has a radius $r_I$ and its ends are spaced by an inductor gap of size $g_I$. The length $l_I$ of the inductor (including the leads 1008(1) and 1008(2)) along x equals the spacing between the patches 1002(1) and 1002(2).

While FIG. 10 shows the planar inductor being shaped as a partial circular loop, the planar inductor may comprise any shape that introduces inductance, and therefore may be a curve, turn, bend, or combination thereof. In other embodiments, the reactive element 1004 is a discrete non-planar inductor (e.g., three-dimensional coil or surface-mount inductor). In this case, the leads 1008(1) and 1008(2) may be sized and positioned to act as solder pads for the non-planar inductor. To facilitate soldering to the non-planar inductor, the leads 1008(1) and 1008(2) may be coated with nickel, tin, silver, or another type of metal used for surface plating of circuit boards. Alternatively, the non-planar inductor may be soldered directly to the edges of the patches 1002(1) and 1002(2), in which case the leads 1008(1) and 1008(2) may be excluded.

In other embodiments, the reactive element 1004 is a planar capacitor that is coplanar with the patches 1002(1), 1002(2), and 1002(3). In this case, the planar capacitor may be formed of two closely spaced, but not directly connected, metallic strips that act like parallel plates. In other embodiments, the reactive element 1004 is a surface-mount capacitor that is positioned between the leads 1008(1) and 1008(2) and soldered thereto. Alternatively, the surface-mount capacitor may be soldered directly to the edges of the patches 1002(1) and 1002(2), in which case the leads 1008(1) and 1008(2) may be excluded.

In FIG. 10, the patches 1002(1), 1002(2), and 1002(3) are shaped as rectangles with the same width w and lengths $l_1$, $l_2$, and $l_3$, respectively. The lengths $l_1$, $l_2$, and $l_3$ may be similar (as shown in FIG. 10) or different. The patches 1002(1), 1002(2), and 1002(3) are spaced along x to create the spaces 1016(1) and 1016(2). As shown in FIG. 11, the first patch 1002(1) has a first edge 1012 that is closest to the second patch 1002(2) and the second patch 1002(2) has a second edge 1014 that is closest to the first patch 1002(1). The edges 1012 and 1014 are parallel to each other and displaced from each other along x by the inductor length $l_I$. Similar arguments hold for the second patch 1002(2) and third patch 1002(3). Thus, the total length l of the antenna element 1000 is $l_1+l_2+l_3+2l_I$, assuming that all of the reactive elements 1004 have the same length $l_I$.

While FIG. 11 shows the edges 1012 and 1014 as being linear, one or both of the edges 1012 and 1014 may alternatively be jagged, curved, piece-wise, undulatory, etc. Accordingly, the patches 1002(1), 1002(2), and 1002(3) need not be rectangular, and therefore may have a different two-dimensional shape without departing from the scope hereof.

Figure 17:
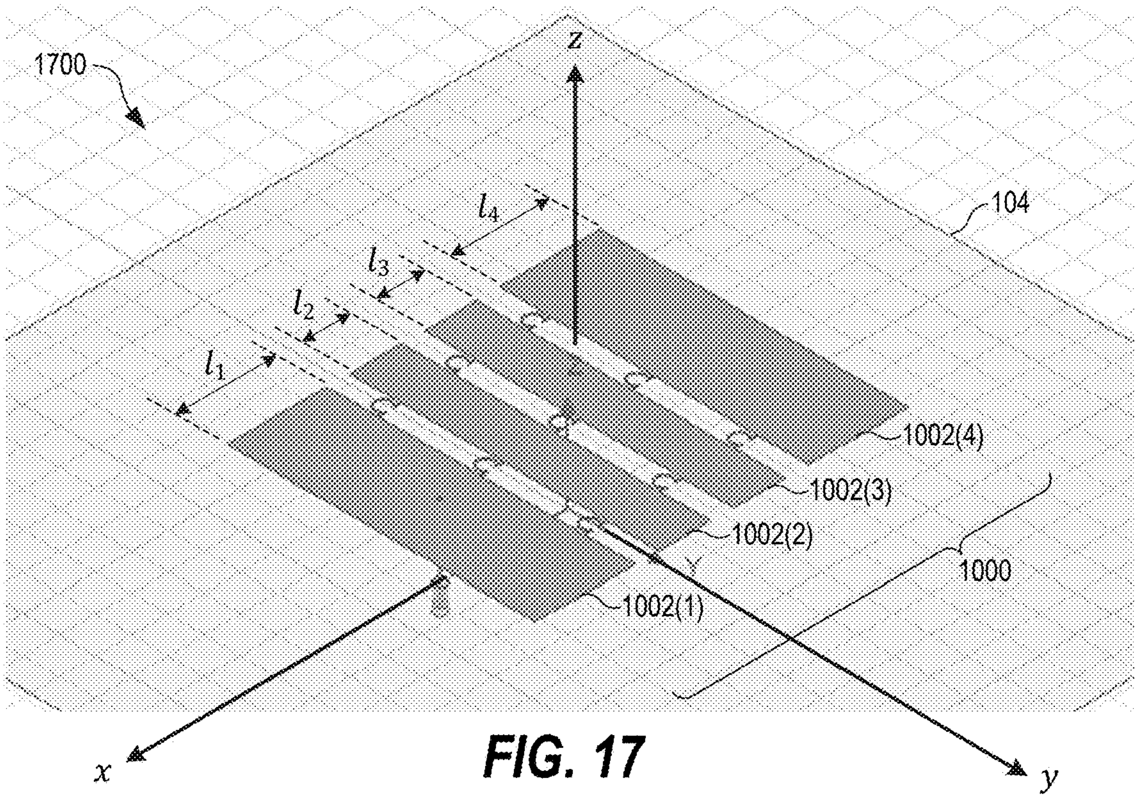
FIG. 17 is a perspective view of an air-loaded patch antenna that is similar to the air-loaded patch antenna of FIG. 12A except that the antenna element has four patches and three spaces, in an embodiment.

While FIG. 10 shows the antenna element 1000 as having three patches 1002(1), 1002(2), and 1002(3), the antenna element 1000 may alternatively include a sequence of two or more patches 1002 (e.g., two, four, five, etc.; see FIG. 17 for an example with four patches 1002). The number of patches 1002 in the sequence may be even or odd. The patches 1002 may be spaced along one axis (e.g., x, as shown in FIG. 10) to form a one-dimensional array. The patches 1002 need not have the same shape and need not form the same spacing 1016 between nearest neighbors.

While FIG. 10 shows the antenna element 100 as having three reactive elements 1004 within each of the spaces 1016(1) and 1016(2), the antenna element 1000 may alternatively have any number of one or more reactive elements 1004 in each of the spaces 1016(1) and 1016(2). The one or more reactive elements 1004 may be any combination of capacitors and inductors, either planar or non-planar. While FIG. 10 shows the reactive elements 1004 uniformly spaced along y, the one or more reactive elements 1004 may be positioned differently without departing from the scope hereof. Changing the locations of the reactive elements 1004 changes the impedance properties of the antenna element 1000. For example, the reactive elements 1004 could be placed closer to the middle of the patches 1002(1), 1002(2), and 1002(3) or farther from the middle. It is not necessary that the reactive elements 1004 be located symmetrically about the middle of the patches 1002(1), 1002(2), and 1002(3).

Figure 12A:
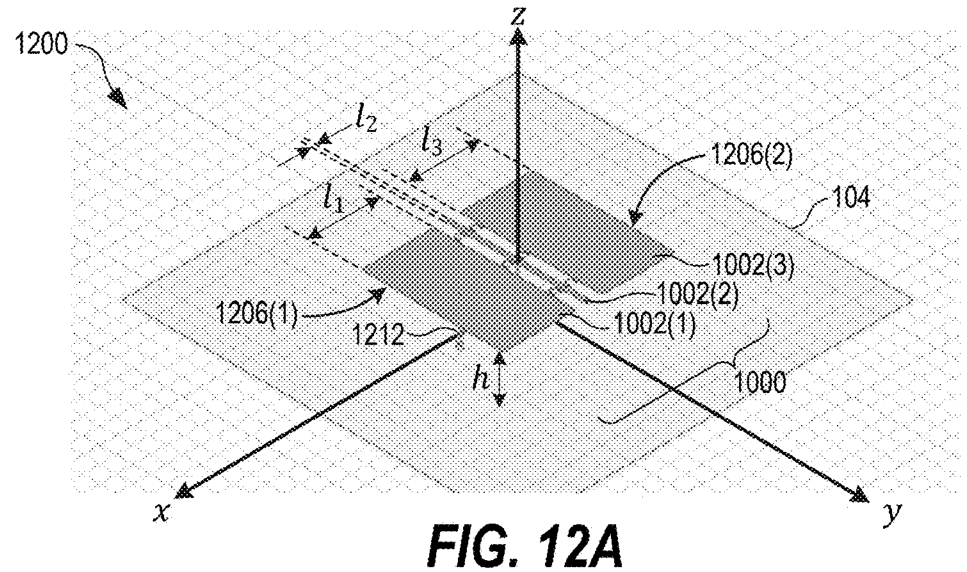
FIG. 12A is a perspective view of an air-loaded patch antenna that is similar to the air-loaded patch antenna of FIG. 1 except that the patch has been replaced with the antenna element of FIG. 10, in an embodiment.

FIG. 12A is a perspective view of an air-loaded patch antenna 1200 that is similar to the air-loaded patch antenna 100 of FIG. 1 except that the patch 102 has been replaced with the antenna element 1000 of FIG. 10. In the example of the antenna element 1000 shown in FIG. 12A, the length $l_2$ of the second patch 1002(2) is less than the length $l_1$ of the first patch 1002(1) and the length $l_3$ of the third patch 1002(3). The patch antenna 1200 has a first radiating edge 1206(1) that is also an edge of the first patch 1002(1) and a second radiating edge 1206(2) that is an edge of the third patch 1002(3). The radiating edges 1206(1) and 1206(2) are the two distal edges along x, similar to the radiating edges 106(1) and 106(2) in FIG. 1. Thus, the resonant dimension of the patch antenna 1200 is parallel to x, like the patch antenna 100 of FIG. 1.

Figure 12B:
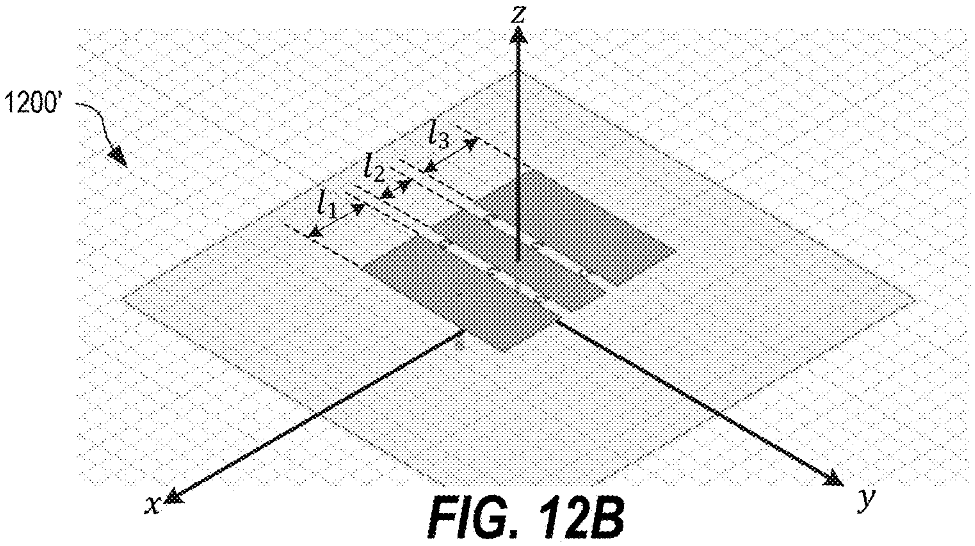
FIG. 12B is a perspective view of an air-loaded patch antenna that is similar to the air-loaded patch antenna of FIG. 12A, in an embodiment.
Figure 12C:
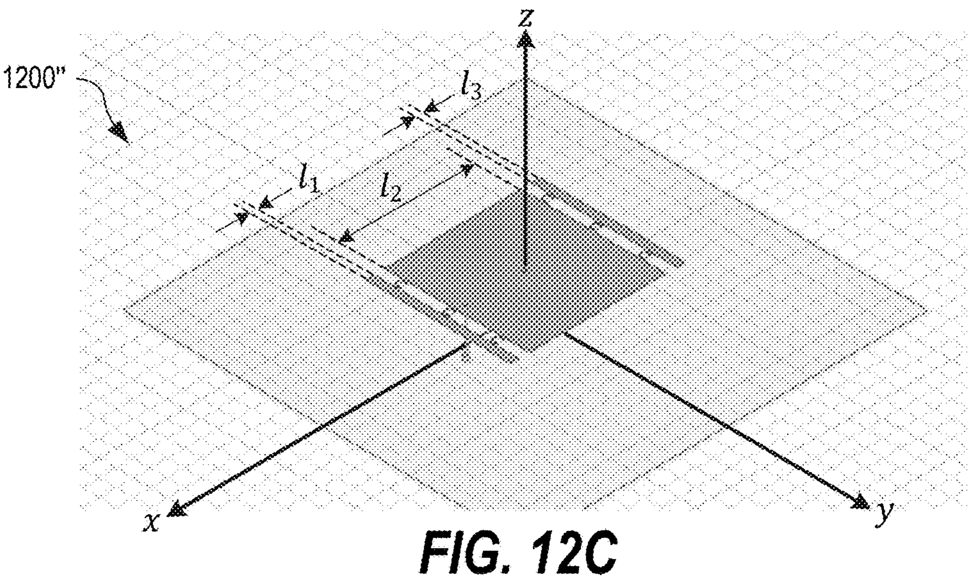
FIG. 12C is a perspective view of an air-loaded patch antenna that is similar to the air-loaded patch antenna of FIG. 12A, in an embodiment.

FIG. 12B is a perspective view of an air-loaded patch antenna 1200' that is similar to the air-loaded patch antenna 1200 of FIG. 12A except that the length $l_2$ is larger, yet still less than $l_1$ and (3. FIG. 12C is a perspective view of an air-loaded patch antenna 1200" that is similar to the air-loaded patch antenna 1200 of FIG. 12A except that the length $l_2$ is larger than $l_1$ and $l_3$.

The patch antenna 1200 may also include a feed 1212 that is similar to the feed 112 of FIG. 1. In the example of FIGS. 12A and 12B, the feed 1212 connects to an interior point of the first patch 1002(1). In the example of FIG. 12C, the feed 1212 connects to an interior point of the second patch 1002(2). However, the feed 1212 may alternatively connect to any other point of the antenna element 1000, such as a point along any edge of any of the patches 1002 or another point in the interior of any of the patches 1002.

In one example of the patch antenna 1200, the patches 1002(1), 1002(2), and 1002(3), and the discrete reactive elements 1004 are located on a first side of an electrically non-conductive substrate (e.g., one or more layers of a printed circuit board). The counterpoise 104 may be formed of electrically conductive material located on a second side of the substrate 1010 that is opposite the first side (e.g., a ground plane). Holes or pockets may be formed in the substrate such that only air exists between the patches 1002 and counterpoise 104. In this case, the counterpoise 104 and antenna element 1000 are parallel and vertically displaced (i.e., along z) from each other by a gap height h that is equal to the thickness of the substrate. In another example of the patch antenna 1200, the patches 1002(1), 1002(2), and 1002(3) and reactive elements 1004 are fabricated from one sheet of metal that is not supported by any substrate. Similarly the counterpoise 104 is fabricated from a second sheet of metal that is also not supported by any substrate.

Figure 13:
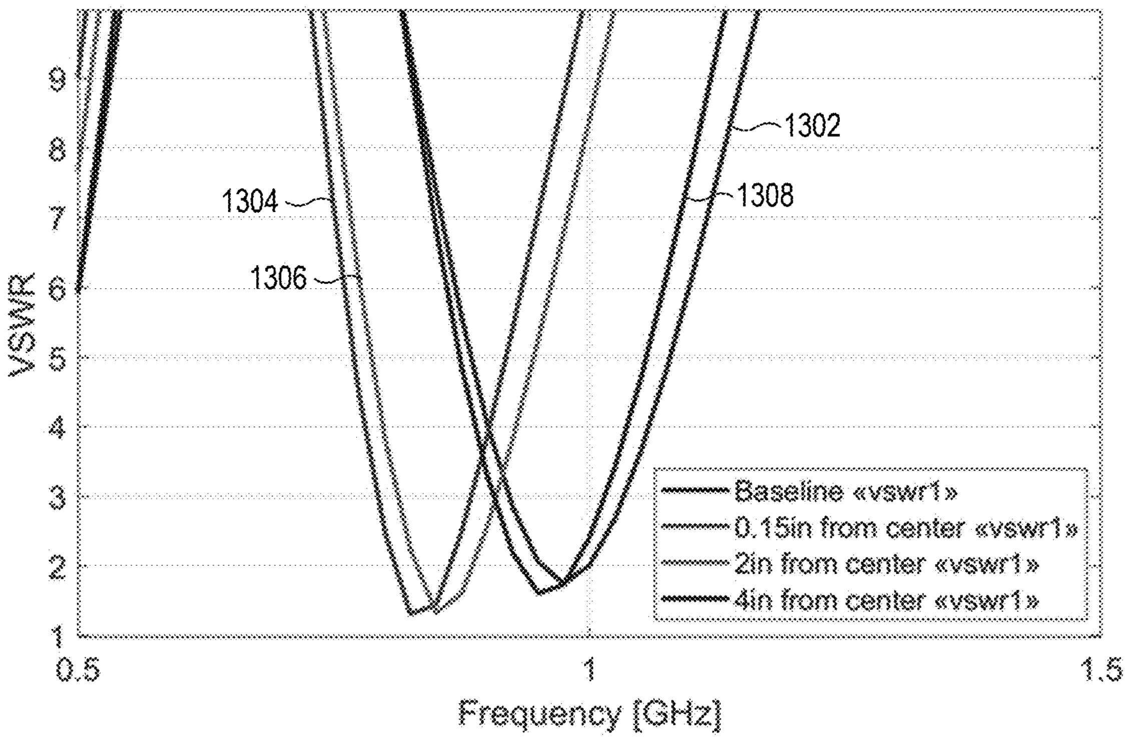
FIG. 13 is a plot of the simulated impedance responses of the air-loaded patch antenna of FIG. 1, the air-loaded patch antenna of FIG. 12A, the air-loaded patch antenna of FIG. 12B, and the air-loaded patch antenna of FIG. 12C.

FIG. 13 is a plot of the simulated impedance responses of the air-loaded patch antenna 100 of FIG. 1 (the curve 1302), the air-loaded patch antenna 1200 of FIG. 12A (see the curve 1304), the air-loaded patch antenna 1200' of FIG. 12B (see the curve 1306), and the air-loaded patch antenna 1200" of FIG. 12C (see the curve 1308). To create this plot, it was assumed that the simulated patch antennas have the same width w, length l, counterpoise 104, and gap height h. For the conventional air-loaded patch antenna 100 (i.e., the curve 1302), the center frequency is 975 MHz and the 3:1 VSWR bandwidth is 10.9%. For the air-loaded patch antenna 1200 (i.e., the curve 1304), it was assumed that the spaces 1016(1) and 1016(2) were centered at x=±0.15 inches, resulting in a center frequency 832 MHz and a 3:1 VSWR bandwidth of 11.4%. For the air-loaded patch antenna 1200' (i.e., the curve 1306), it was assumed that the spaces 1016(1) and 1016(2) were centered at x=±2 inches, resulting in a center frequency of 850 MHz and a 3:1 VSWR bandwidth of 11.5%. For the air-loaded patch antenna 1200" (i.e., the curve 1308), it was assumed that the spaces 1016(1) and 1016(2) were centered at x=±4 inches, resulting in a center frequency of 960 MHz and a 3:1 VSWR bandwidth of 10.9%.

FIG. 13 shows that as the length $l_2$ is increased and the lengths $l_1$ and $l_3$ are decreased (i.e., the reactive elements 1004 are placed closer to the radiating edges 1206(1) and 1206(2) and farther from the center of the antenna element 1000), the response of the air-loaded patch antenna 1200 approaches that of the conventional air-loaded patch antenna 100. FIG. 13 also shows how the use of planar reactive elements 1004 reduces the resonant frequency, thereby allowing the air-loaded patch antenna 1200 to have a smaller footprint than the conventional air-loaded patch antenna 100 (for the same resonant frequency).

Figure 14:
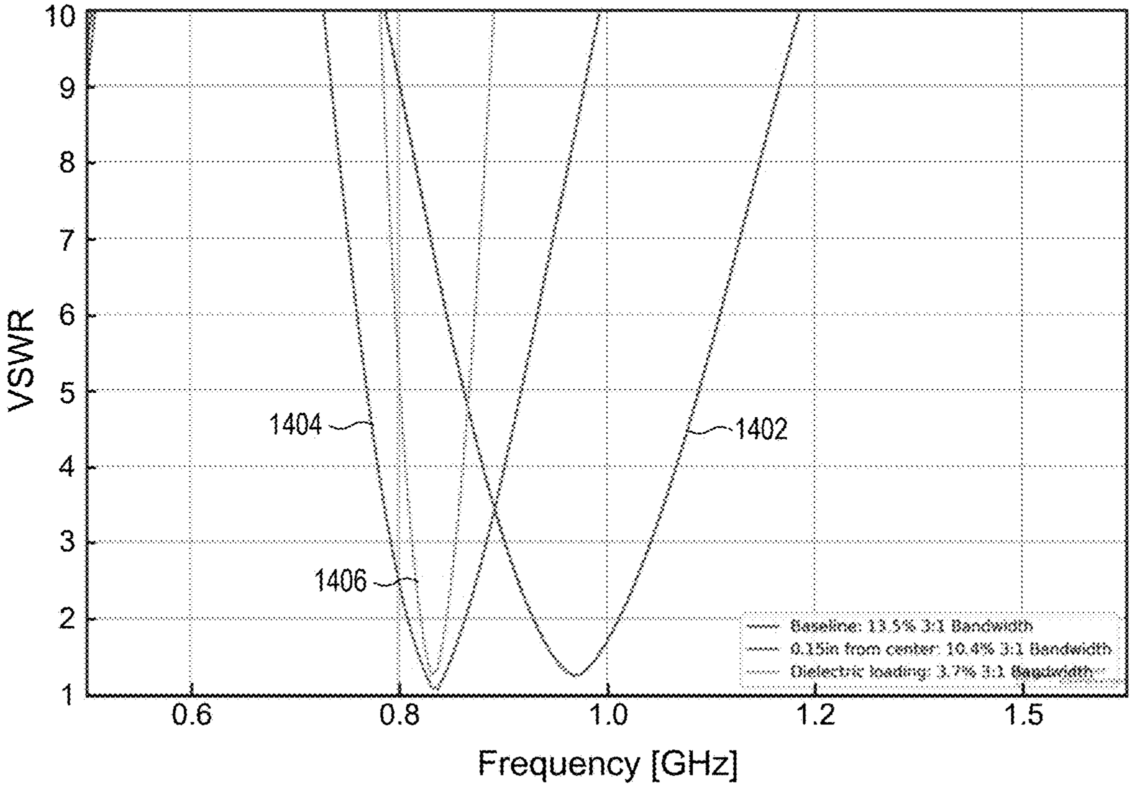
FIG. 14 is a plot of the simulated impedance responses of the air-loaded patch antenna 100 of FIG. 1, the air-loaded patch antenna of FIG. 12A, and the dielectric-loaded patch antenna of FIG. 4.
Figure 15:
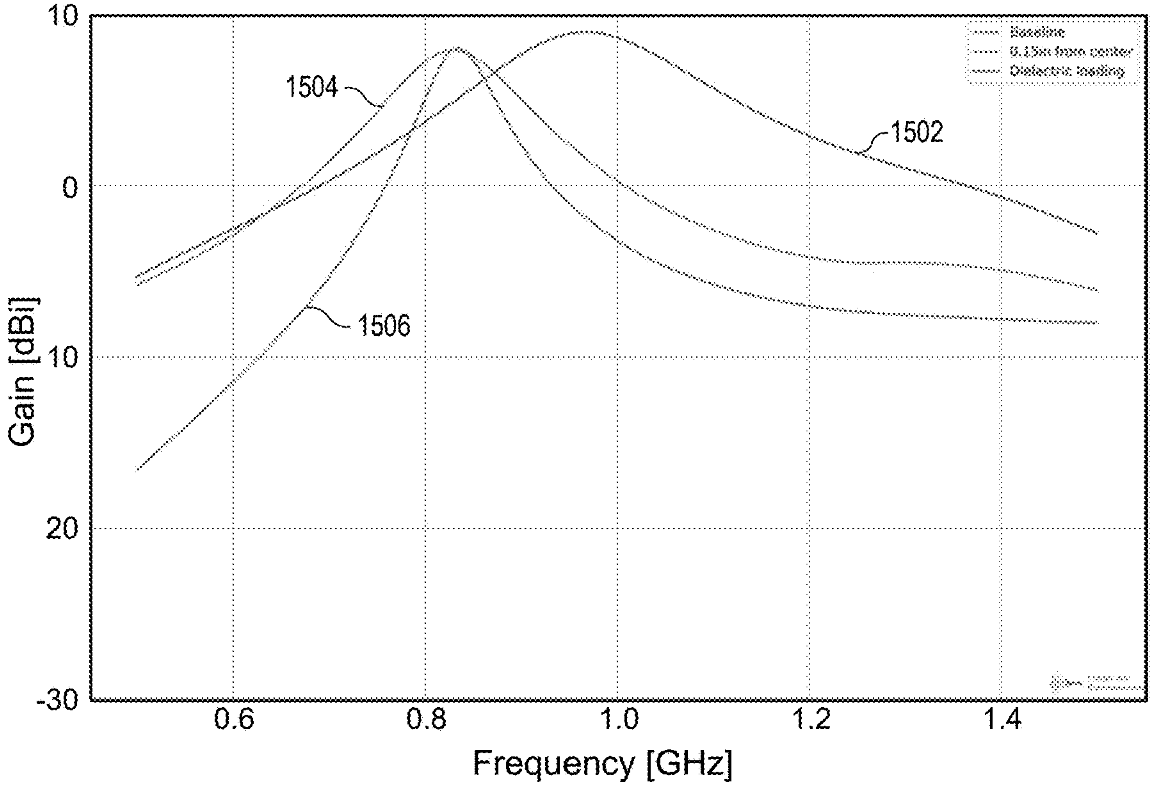
FIG. 15 is a plot of the simulated gains of the air-loaded patch antenna of FIG. 1, the air-loaded patch antenna of FIG. 12A, and the dielectric-loaded patch antenna of FIG. 4.

FIG. 14 is a plot of the simulated impedance responses of the air-loaded patch antenna 100 of FIG. 1 (see the curve 1402), the air-loaded patch antenna 1200 of FIG. 12A (see the curve 1404), and the dielectric-loaded patch antenna 400 of FIG. 4 (see the curve 1406). FIG. 15 is a plot of the simulated gains of the air-loaded patch antenna 100 of FIG. 1 (see the curve 1502), the air-loaded patch antenna 1200 of FIG. 12A (see the curve 1504), and the dielectric-loaded patch antenna 400 of FIG. 4 (see the curve 1506). FIGS. 14 and 15 are best viewed together with the following description.

To create the plots of FIGS. 14 and 15, it was assumed that the simulated patch antennas have the same width w, overall length l, counterpoise 104, and gap height h. The conventional air-loaded patch antenna 100 has a center frequency of 970 MHz, a 3:1 VSWR bandwidth of 13.5%, a peak gain of 8.9 dBi, and a half-power bandwidth of 23.2%. For the air-loaded patch antenna 1200, it was assumed that the spaces 1016(1) and 1016(2) were centered at x=±0.15 inches, resulting in a center frequency of 832 MHz, a 3:1 VSWR bandwidth of 10.4%, a peak gain of 7.8 dBi, and a half-power bandwidth of 16.5%. For the dielectric-loaded patch antenna 400, it was assumed that the dielectric material 402 has a relative permittivity of $\epsilon_r$=1.8, resulting in a center frequency of 832 MHz, a 3:1 VSWR bandwidth of 3.7%, a peak gain of 7.7 dBi, and a half-power bandwidth of 8.2%.

FIGS. 14 and 15 show that the air-loaded patch antenna 1200 reduces the resonant frequency similarly to the dielectric-loaded patch antenna 400, and therefore can reduce the footprint by a similar amount. However, the air-loaded patch antenna 1200 advantageously has higher bandwidth than the dielectric-loaded patch antenna 400 (although still less than that of the conventional patch antenna 100). The patch antennas 1200 and 400 have similar peak gains, and therefore the higher bandwidth does not come at the expense of peak gain.

Figure 16A:
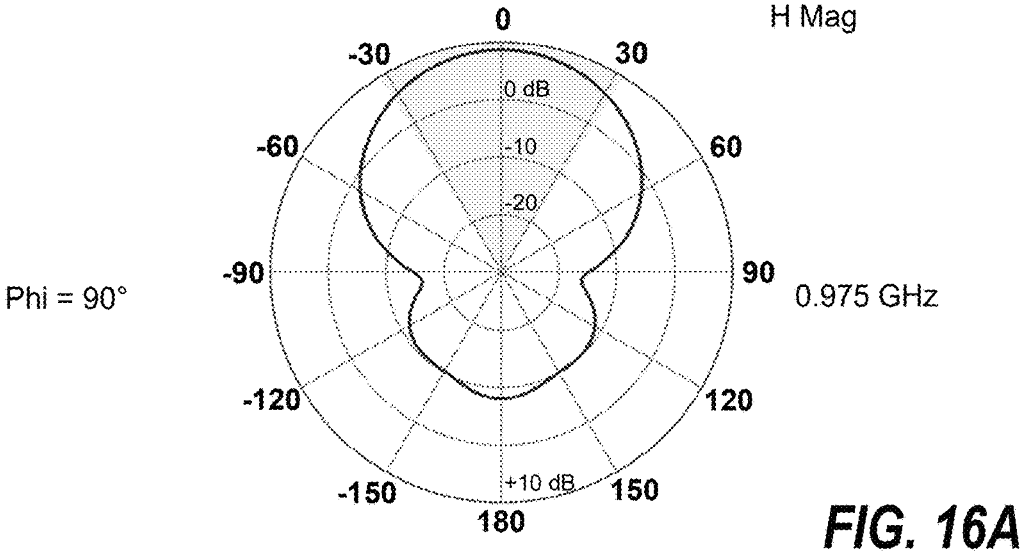
FIG. 16A shows the simulated propagation pattern of the conventional air-loaded patch antenna of FIG. 1.
Figure 16B:
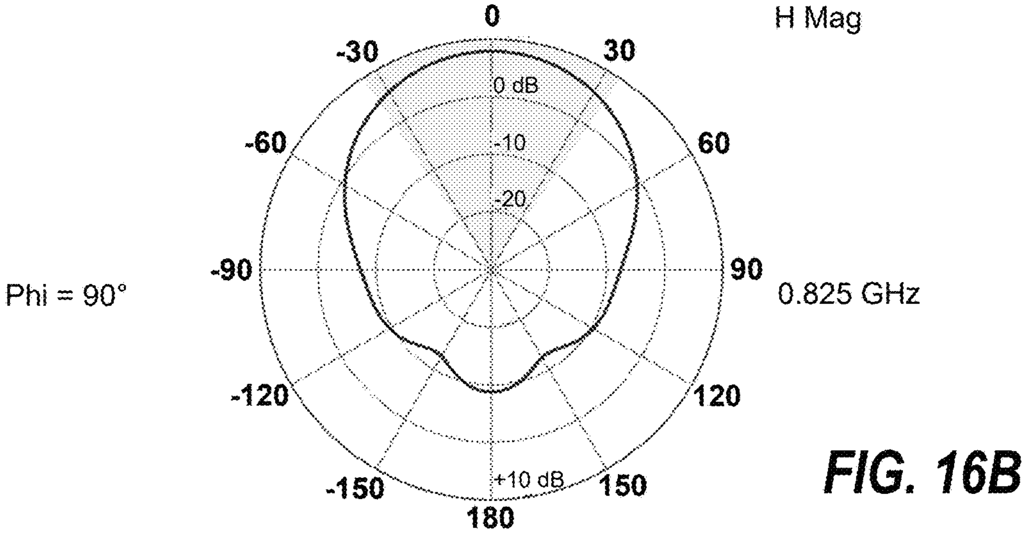
FIG. 16B shows the simulated propagation pattern of the air-loaded patch antenna of FIG. 12A.
Figure 16C:
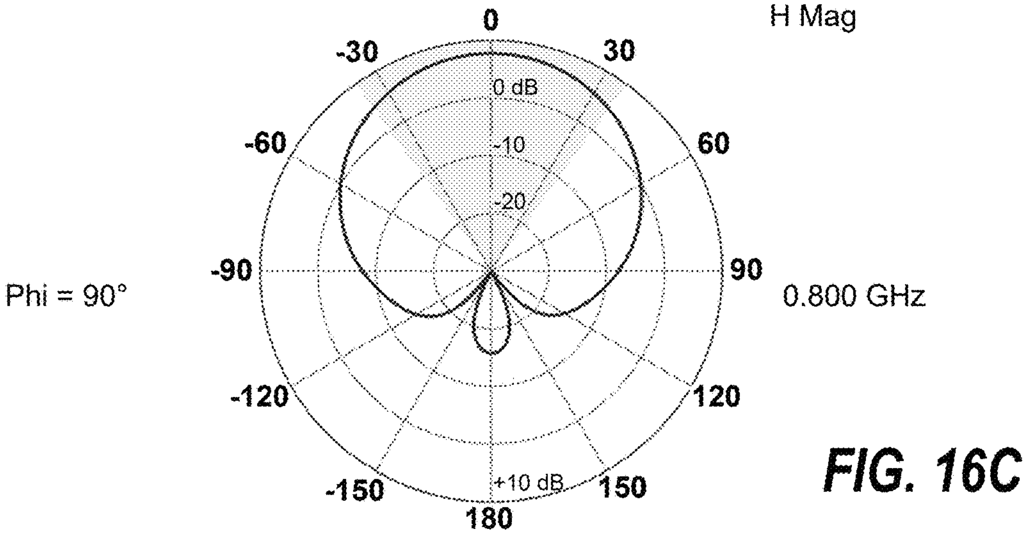
FIG. 16C shows the simulated propagation pattern of the dielectric-loaded patch antenna of FIG. 4.

FIG. 16A shows the simulated propagation pattern of the conventional air-loaded patch antenna 100 of FIG. 1. This propagation pattern shows that at 0.975 GHz, the patch antenna 100 has a half-power beam width of 64°. FIG. 16B shows the simulated propagation pattern of the air-loaded patch antenna 1200 of FIG. 12A. This propagation pattern shows that at 0.825 GHz, the patch antenna 1200 has a half-power beam width of 68°. FIG. 16C shows the simulated propagation pattern of the dielectric-loaded patch antenna 400 of FIG. 4. This propagation pattern shows that at 0.800 GHz, the patch antenna 400 has a half-power beam width of 72°. Thus, the patch antennas 1200 and 400 have slightly larger beam widths than the patch antenna 100.

Figure 18:
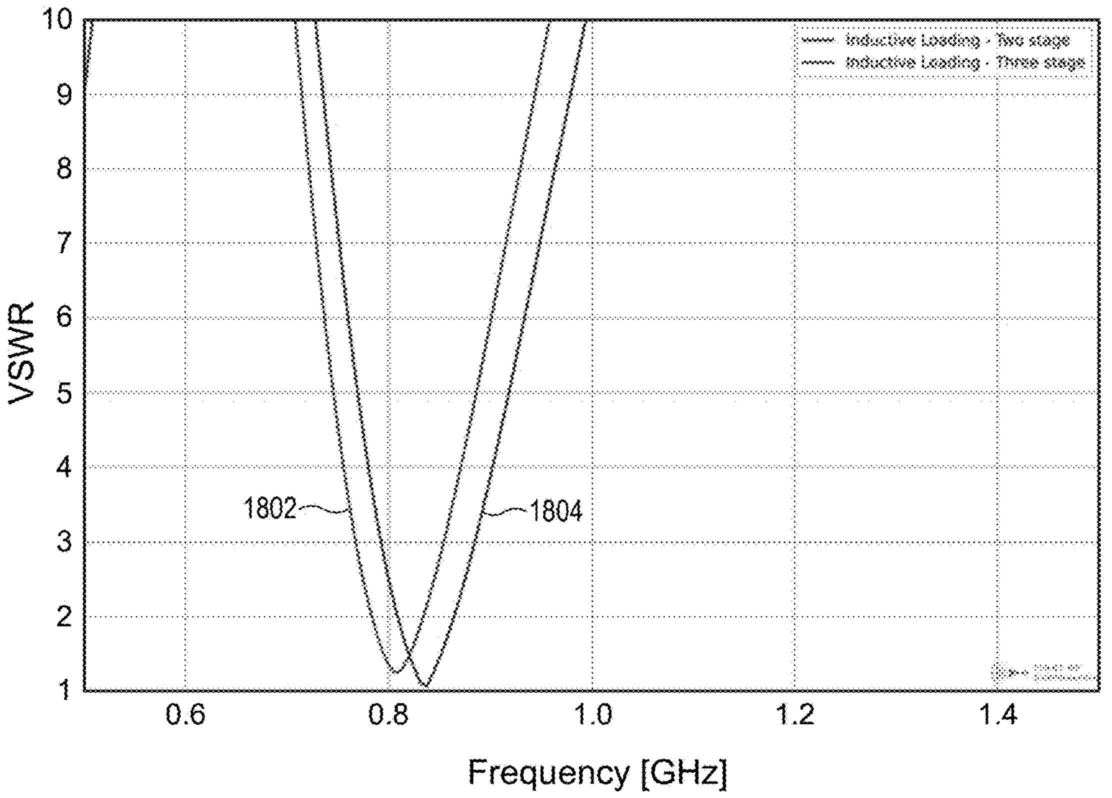
FIG. 18 is a plot of the simulated impedance responses of the air-loaded patch antenna of FIG. 17 and the air-loaded patch antenna of FIG. 12A.

FIG. 17 is a perspective view of an air-loaded patch antenna 1700 that is similar to the air-loaded patch antenna 1200 of FIG. 12A except that the antenna element 1000 has four patches 1002 and three spaces 1016 (for clarity, the spaces 1016 are unlabeled in FIG. 17). FIG. 18 is a plot of the simulated impedance responses of the air-loaded patch antenna 1700 of FIG. 17 (see the curve 1802) and the air-loaded patch antenna 1200 of FIG. 12A (see the curve 1804). FIGS. 17 and 18 are best viewed together with the following description.

The patch antenna 1700 has a total of nine planar inductors arranged in three stages (i.e., three spaces 1016), three more than the two-stage patch antenna 1200. As shown in FIG. 18, the additional inductance introduced by an additional stage further reduces the resonant frequency. Accordingly, the patch antenna 1700 can have a smaller footprint than the patch antenna 1200 for the same resonant frequency. In other embodiments, the patch antenna 1700 has more than three stages (e.g., four stages with five patches 1002, etc.). The additional inductance from these additional stages further reduces the resonant frequency, thereby leading to an even smaller footprint. While FIG. 17 shows the patches 1002(1) and 1002(4) having the same length (i.e., $l_1=l_4$) and the patches 1002(2) and 1002(3) having the same length (i.e., $l_2=l_4$), the patches 1002 may have any combination of lengths without departing from the scope hereof.

Figure 19:
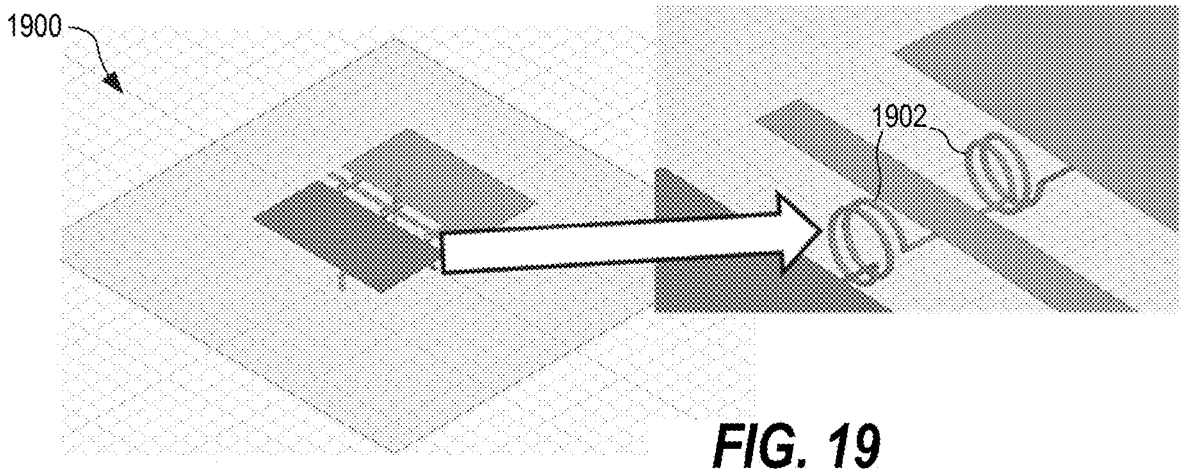
FIG. 19 is a perspective view of an air-loaded patch antenna that is similar to the air-loaded patch antenna of FIG. 12A except that the planar inductors have been replaced with nonplanar helical coils, in an embodiment.
Figure 20:
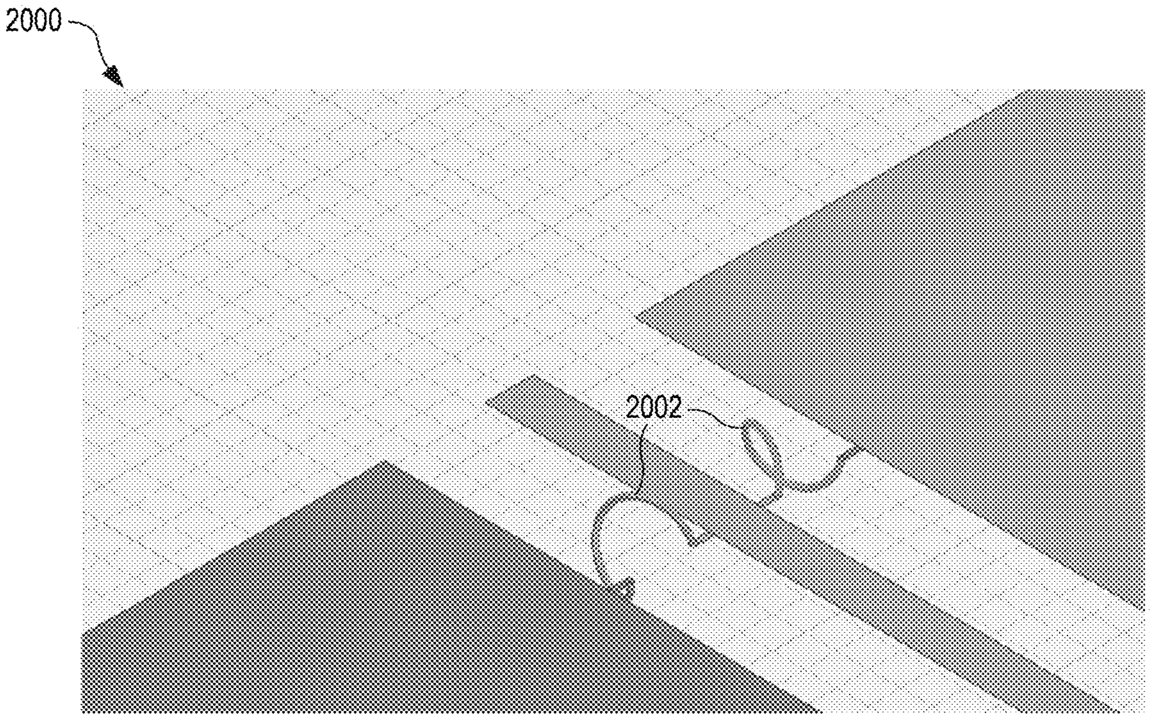
FIG. 20 is a perspective view of an air-loaded patch antenna that is similar to the air-loaded patch antenna of FIG. 19 except that it has nonplanar helical coils that each forms only one circular loop, in an embodiment.
Figure 21:
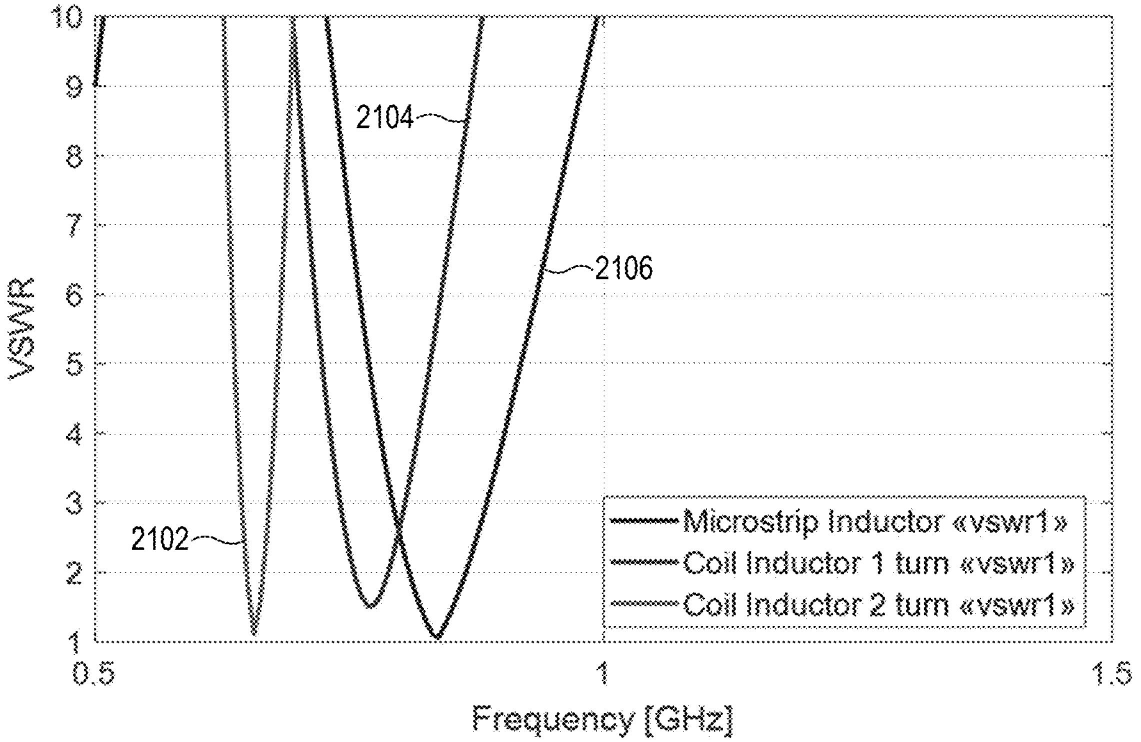
FIG. 21 is a plot of the simulated impedance responses of the air-loaded patch antenna of FIG. 19, the air-loaded patch antenna of FIG. 20, and the air-loaded patch antenna of FIG. 12A.

FIG. 19 is a perspective view of an air-loaded patch antenna 1900 that is similar to the air-loaded patch antenna 1200 of FIG. 12A except that the planar inductors (see FIG. 11) have been replaced with nonplanar helical coils 1902, each forming two circular loops. FIG. 20 is a perspective view of an air-loaded patch antenna 2000 that is similar to the air-loaded patch antenna 1900 of FIG. 19 except that it has nonplanar helical coils 2002, each forming only one circular loop. FIG. 21 is a plot of the simulated impedance responses of the air-loaded patch antenna 1900 (see the curve 2102), the air-loaded patch antenna 2000 (see the curve 2104), and the air-loaded patch antenna 1200 of FIG. 12A (see the curve 2106). FIGS. 19-21 are best viewed together with the following description.

To create the plot of FIG. 21, it was assumed that the simulated patch antennas have the same width w, length l, counterpoise 104, and gap height h. It was also assumed that the helical coils 1902 and 2002 are identical except for the number of turns. Due to the greater number of loops, each of the two-loop helical coils 1902 has a higher inductance that each of the one-loop helical coils 2002, which is turn has more inductance that the planar inductor shown in FIG. 11. As a result, the patch antenna 1900 has higher inductance than the patch antenna 2000, which in turn has a higher inductance than the patch antenna 1200. This order of inductances can be seen in FIG. 21, where the patch antenna 1900 has a lower resonant frequency than the patch antenna 2000, which in turn has a lower resonant frequency than the patch antenna 1200. Thus, in this example the use of non-planar inductors can reduce the patch-antenna footprint more than a similar number of lower-inductance planar inductors.

Figure 22:
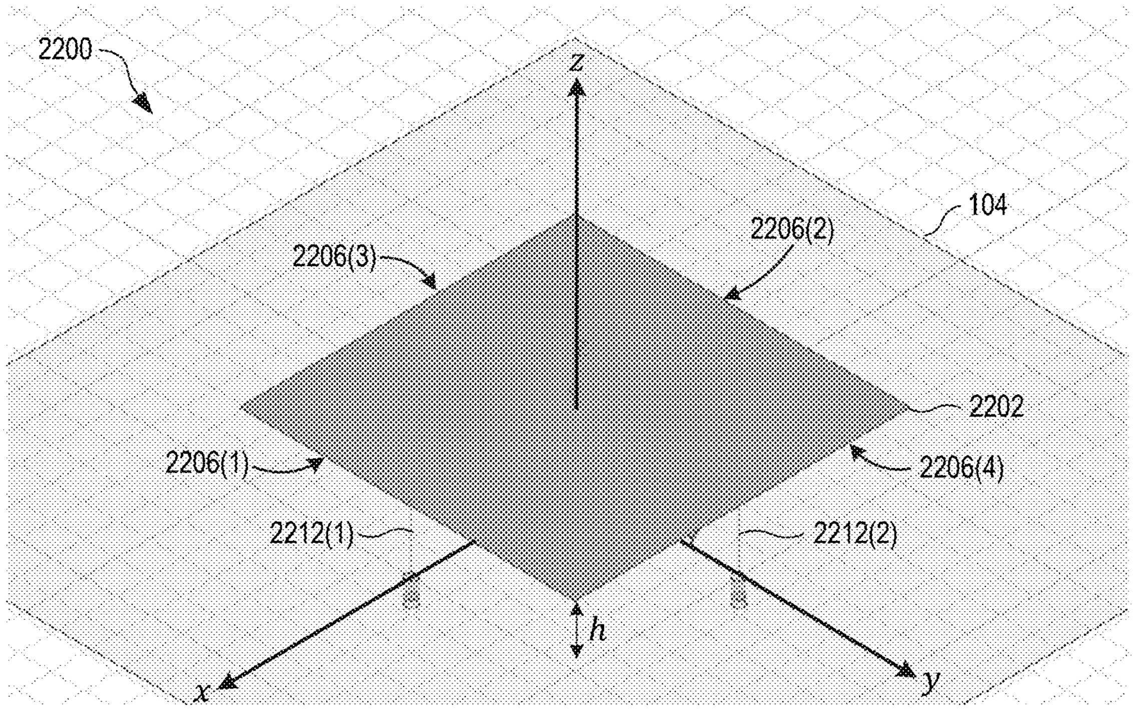
FIG. 22 (PRIOR ART)
FIG. 22 is a perspective view of a conventional air-loaded dual-polarization microstrip patch antenna.

FIG. 22 is a perspective view of a conventional air-loaded dual-polarization microstrip patch antenna 2200. The patch antenna 2200 is similar to the patch antenna 100 of FIG. 1 except that it can independently radiate with two orthogonal polarizations. The patch antenna 2200 includes a planar patch 2202 that is similar to the patch 102 of FIG. 1 except that it has an additional feed. Specifically, the patch antenna 2200 has a first feed 2212(1) and a second feed 2212(2). The patch antenna 2200, when driven via the first feed 2212(1), will emit radiation polarized along x. In this case, a first edge 2206(1) and a second edge 2206(2) of the patch 2202 are the radiating edges that predominantly generate the x-polarized radiation. However, when the patch antenna 2200 is driven via the second feed 2212(2), it will emit radiation polarized along y. In this case, a third edge 2206(3) and a fourth edge 2206(4) of the patch 2202 are the radiating edges that predominantly generate the y-polarized radiation. More generally, when the feeds 2212(1) and 2212(2) are driven with two copies of the same drive signal that are in-phase with each other, but have different amplitudes, the patch antenna 2200 will emit radiation that is linearly polarized at an angle in the x-y plane that is based on the different amplitudes. Alternatively, when the feeds 2212(1) and 2212(2) are driven with two copies of the same drive signal that are phase-shifted by ±90° (with respect to each other) and have the same amplitude, the patch antenna 2200 will emit circularly-polarized radiation.

Figure 23:
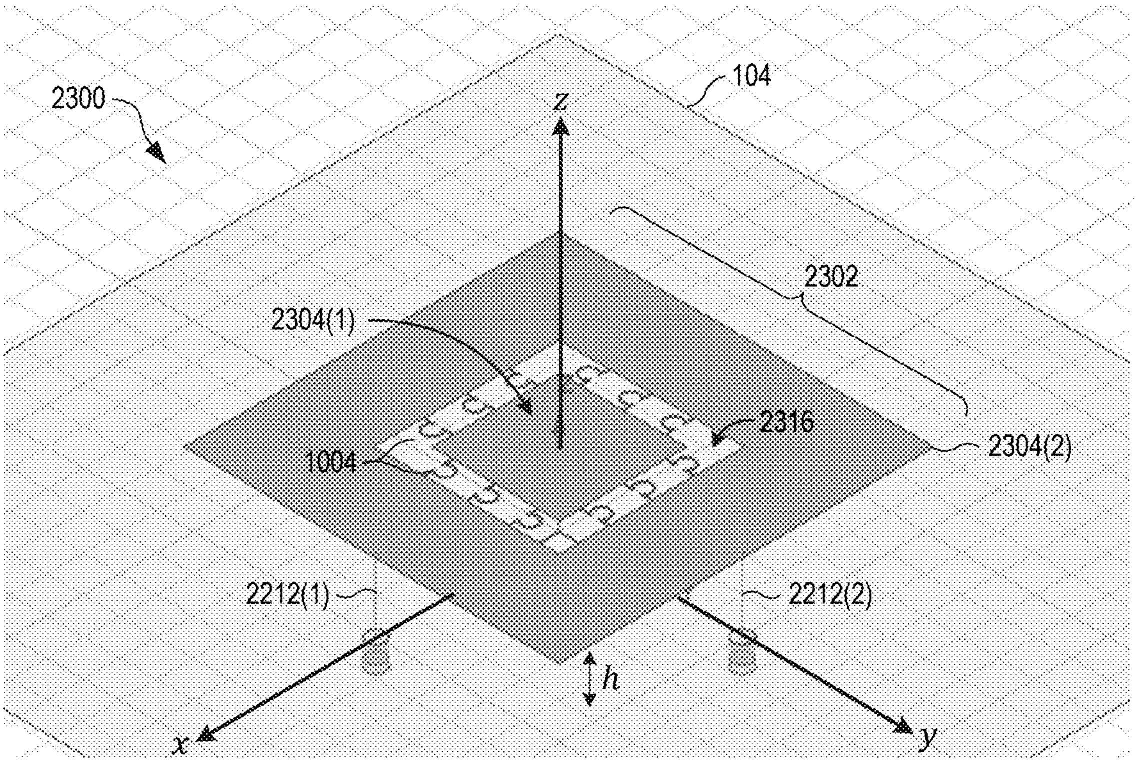
FIG. 23 is a perspective view of an air-loaded dual-polarization microstrip patch antenna that is similar to the conventional dual-polarization patch antenna of FIG. 22 except that the patch has been replaced with an antenna element having discrete reactive elements, in an embodiment.

FIG. 23 is a perspective view of an air-loaded dual-polarization microstrip patch antenna 2300 that is similar to the conventional patch antenna 2200 of FIG. 22 except that the patch 2202 has been replaced with an antenna element 2302. The patch antenna 2300 may be thought of as the dual-polarization version of the patch antenna 1200 of FIG. 12A. The antenna element 2302 includes a first patch 2304(1) and a second patch 2304(2) that are coplanar (i.e., lying in the same x-y plane) and formed from electrically conductive material (e.g., metal). The second patch 2304(2) fully surrounds the first patch 2304(1) in the x-y plane, thereby forming an electrically insulating space 2316 that also fully surrounds the first patch 2304(1) in this plane. One or more discrete reactive elements 1004 located in the space 2316 electrically connect the patches 2304(1) and 2304(2) together. For clarity in FIG. 23, only two of the discrete reactive elements 1004 are labeled. While FIG. 23 shows the discrete reactive elements 1004 as being planar inductors like that shown in FIG. 11, the discrete reactive elements 1004 may alternatively be planar capacitors or any combination of planar capacitors and planar inductors. In other embodiments, the discrete reactive elements 1004 are non-planar (e.g., the helical coils 1902 of FIG. 19, the helical coils 2002 of FIG. 20, surface-mount capacitors, surface-mount inductors, etc.).

In the example of FIG. 23, the first patch 2304(1) is a square with two edges parallel to x and the other two edges parallel to y. The square is centered in x and y at the origin. The second patch 2304(2) is shaped as a square annulus that is also centered in x and y at the origin. The electrically insulating inner square of the square annulus has an edge length that is greater than the edge length of the first patch 2304(1). In this case, the first patch 2304(1) can be centered within the inner square such that the space 2316 has the same size on all four sides of the first patch 2304 (i.e., the patches 2304(1) and 2304(2) are concentric). However, the first patch 2304(1) need not be centered in the inner square, thereby resulting in the space 2316 having different sizes on the four sides of the first patch 2304. Alternatively, the first patch 2304(1) may be rectangular, again resulting in the space 2316 having different sizes on the four sides of the first patch 2304. The second patch 2304(2) may also be rectangular, in which case the patch antenna 2300 will have different resonant frequencies for x and y polarizations.

Figure 24:
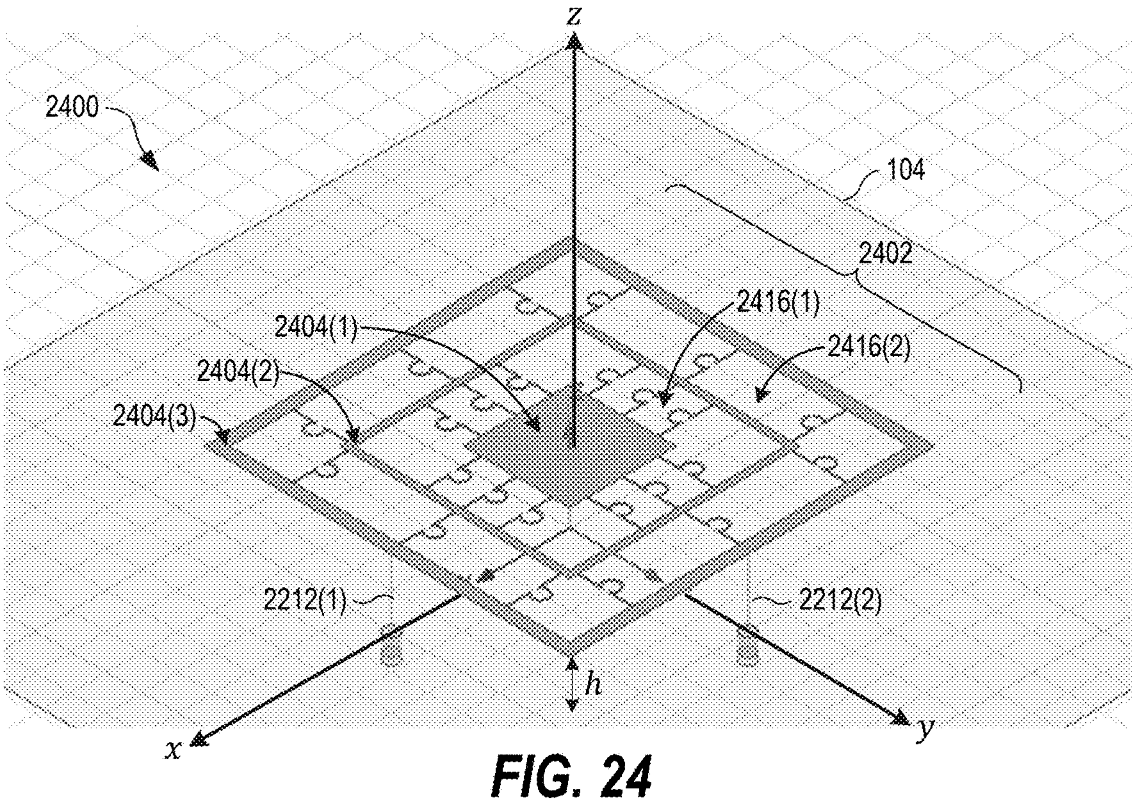
FIG. 24 is a perspective view of an air-loaded dual-polarization microstrip patch antenna that is similar to the patch antenna of FIG. 23 except that it includes a third patch, in an embodiment.

FIG. 24 is a perspective view of an air-loaded dual-polarization microstrip patch antenna 2400 that is similar to the patch antenna 2300 of FIG. 23 except that that antenna element 2302 has been replaced with an antenna element 2402 that includes a third patch. Specifically, the antenna element 2402 includes a first patch 2404(1), a second patch 2404(2), and a third patch 2404(3) that are coplanar and formed from electrically conductive material. The second patch 2404(2) fully surrounds the first patch 2404(1) in the x-y plane to form a first electrically insulating space 2416(1) that also fully surrounds the first patch 2404(1) in this plane. Reactive elements 1004 located in the first space 2416(1) electrically connect the patches 2404(1) and 2404(2) together. The third patch 2404(3) fully surrounds the second patch 2404(2) in the x-y plane to form a second electrically insulating space 2416(2) that also fully surrounds the second patch 2404(2) in this plane. Additional discrete reactive elements 1004 located in the second space 2416(2) electrically connect the patches 2404(2) and 2404(3) together. While FIG. 24 shows the first patch 2404(1) as a square, the second patch 2404(2) as a square annulus, and the third patch 2404(3) as a square annulus, one or more of the patches 2404 may be shaped differently without departing from the scope hereof. Furthermore, while FIG. 24 shows the patches 2404(1), 2404(2), and 2404(3) as being concentric, these patches may be placed differently than shown without departing from the scope hereof.

The patch antenna 2400 has two stages (i.e., spaces 2416 within which reactive elements 1004 lie), one more than that of the patch antenna 2300. This additional stage introduces additional inductance that further reduces the resonant frequencies. Accordingly, the patch antenna 2400 can have a smaller footprint than the patch antenna 2300 for the same resonant frequencies. In other embodiments, the patch antenna 2400 has more than two stages (e.g., four concentric patches forming three spaces 2416). The additional inductance from additional stages can further reduce the resonant frequencies, thereby leading to an even smaller footprint.

The patches 2304 and 2404 need not be rectangular. For example, the patches 2304(1) and 2304(2) may be shaped as a polygon, either regular or irregular, or another two-dimensional shape with one or more curved edges. The same applies for the patches 2404(1), 2404(2), and 2404(3).

Figure 25:
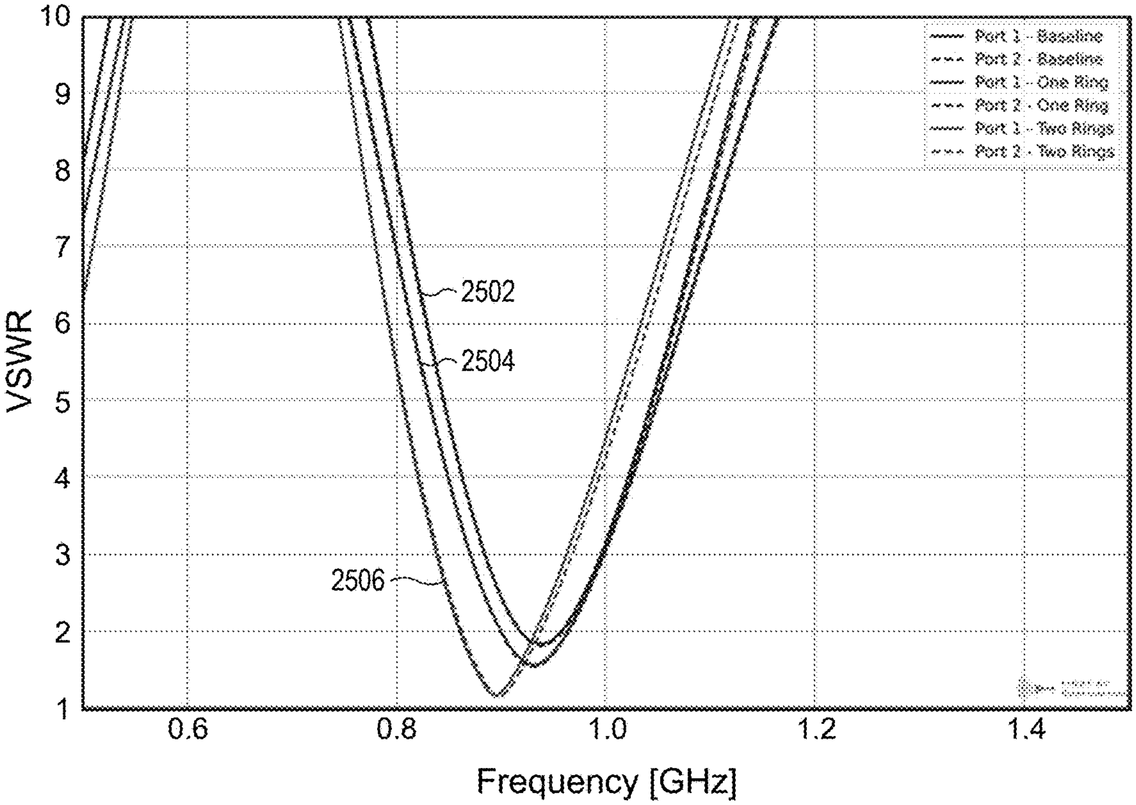
FIG. 25 is a plot of the simulated impedance responses of the conventional air-loaded patch antenna of FIG. 22, the air-loaded patch antenna of FIG. 23, and the air-loaded patch antenna of FIG. 24.

FIG. 25 is a plot of the simulated impedance responses of the conventional air-loaded patch antenna 2200 of FIG. 22 (see the curves 2502), the air-loaded patch antenna 2300 of FIG. 23 (see the curves 2504), and the air-loaded patch antenna 2400 of FIG. 24 (see the curves 2506). For each of the three simulated patch antennas, two curves are plotted, one for each of the two linear polarizations. To create the plot of FIG. 25, it was assumed that the simulated patch antennas have the same width w, length l, counterpoise 104, and gap height h. As described above, the patch antenna 2400 has more inductance than the patch antenna 2300, which has more inductance than the patch antenna 2200. This order of inductances can be seen in FIG. 25, where the patch antenna 2400 has a lower resonant frequency than the patch antenna 2300, which in turn has a lower resonant frequency than the patch antenna 2200.

Figure 26:
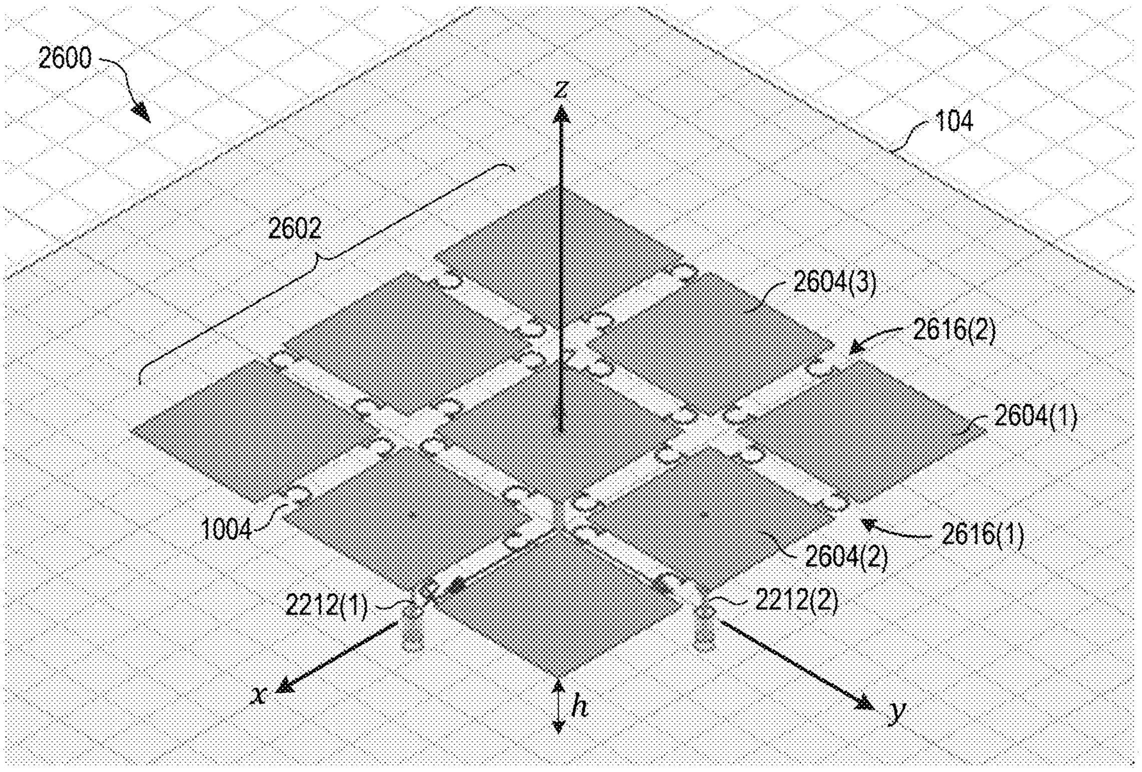
FIG. 26 is a perspective view of an air-loaded dual-polarization microstrip patch antenna that is similar to the patch antenna of FIG. 23 except that the antenna element has been replaced with a plurality of patches arranged in a lattice, in embodiments.

FIG. 26 is a perspective view of an air-loaded dual-polarization microstrip patch antenna 2600 that is similar to the patch antenna 2300 of FIG. 23 except that the antenna element 2302 has been replaced with a plurality of patches 2604 arranged in a lattice 2602. The patches 2604 are coplanar, formed from electrically conductive material, and spaced to create electrically insulating spaces 2616 therebetween. For example, FIG. 26 shows a first patch 2604(1) and a second patch 2604(2) separated along x to create a first space 2616(1) therebetween. The patches 2604(1) and 2604(2) therefore form a nearest-neighbor pair. FIG. 26 also shows a third patch 2604(3) that is displaced from the first patch 2604(1) along y to create a second space 2616(2). The patches 2604(1) and 2604(3) therefore also form a nearest-neighbor pair. More generally, each of the patches 2604 belongs to more than one nearest-neighbor pair. For example, the center patch belongs to four nearest-neighbor pairs while each corner patch belongs to only two nearest-neighbor pairs.

Located within each of the spaces 2616 is at least one reactive element 1004 (for clarity in FIG. 26, only one of the reactive element 1004 is labeled) that electrically connects to both patches of the nearest-neighbor pair. In the example of FIG. 26, there are two planar inductors electrically connecting each nearest-neighbor pair. A different number of reactive elements 1004 may be used to electrically connect each nearest-neighbor pair (e.g., one, three, four, etc.). While FIG. 26 shows the reactive elements 1004 as planar inductors, the reactive elements 1004 may alternatively be any combination of planar inductors, planar capacitors, non-planar inductors, and non-planar capacitors.

In FIG. 26, the nine patches 2604 of the lattice 2602 are arranged in three rows and three columns. However, the lattice 2602 may have a different number of rows, a different number of columns, or both, without departing from the scope hereof. In some embodiments, the lattice 2602 is not rectangular (i.e., the rows do not all have the same number of patches 2604, the columns do not all have the same number of patches 2604, or both). Furthermore, while FIG. 26 shows the spaces 2616 having the same size, the spaces 2616 may have different sizes. For example, all of the spaces 2616 running parallel to x may have a first size (in the y direction) while all of the spaces 2616 running parallel to y have a second size (in the x direction) that is different from the first size. In other embodiments, the patches are not spaced equally along x, along y, or both. While FIG. 26 shows each of the patches 2604 as a square, any of the patches 2604 may have a different two-dimensional shape without departing from the scope hereof.

Figure 27:
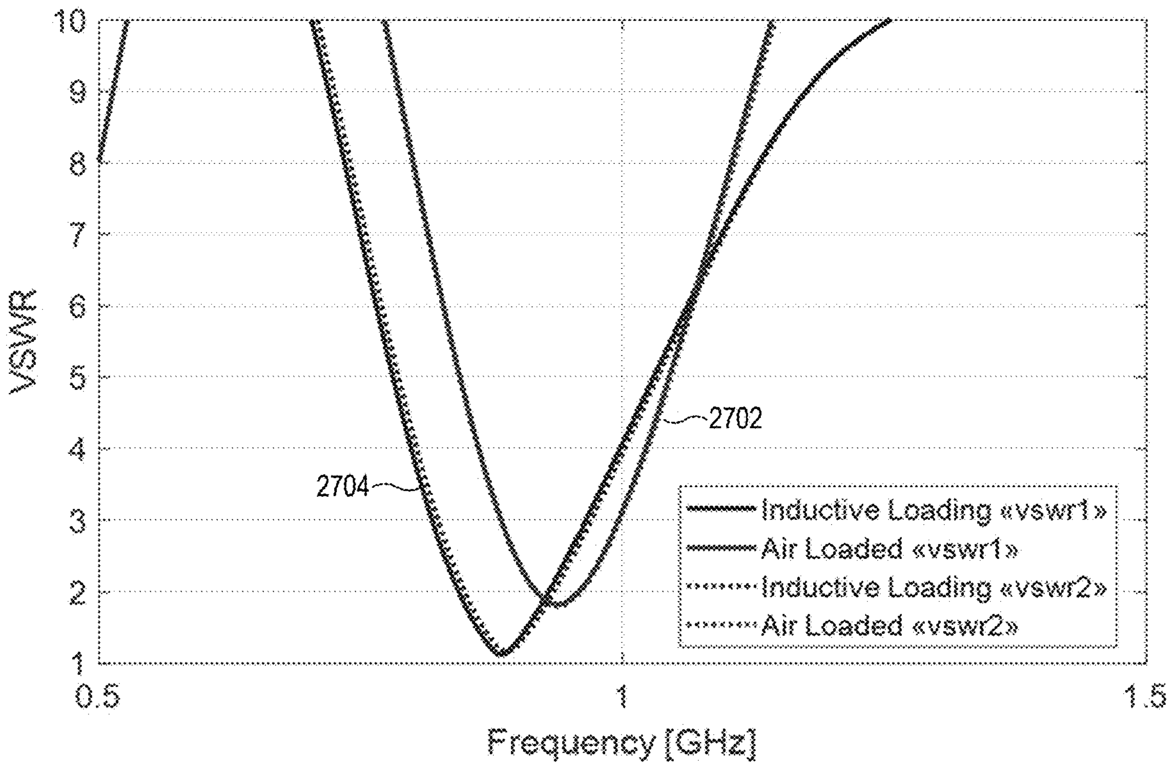
FIG. 27 is a plot of the simulated impedance responses of the conventional air-loaded patch antenna of FIG. 22 and the air-loaded patch antenna of FIG. 26.

FIG. 27 is a plot of the simulated impedance responses of the conventional air-loaded patch antenna 2200 of FIG. 22 (see the curves 2702) and the air-loaded patch antenna 2600 of FIG. 26 (see the curves 2704). For each of the two simulated patch antennas, two curves are plotted, one for each of the two linear polarizations. The curves 2702 are the same as the curves 2502 shown in FIG. 25. To create the plot of FIG. 27, it was assumed that the simulated patch antennas have the same width w, length l, counterpoise 104, and gap height h. The plot of FIG. 27 shows that the inductance introduced by the reactive elements 1004 lowers the resonant frequency, thereby allowing the patch antenna 2600 to have a smaller footprint than the patch antenna 2200 (for the same resonant frequency).

Figure 28:
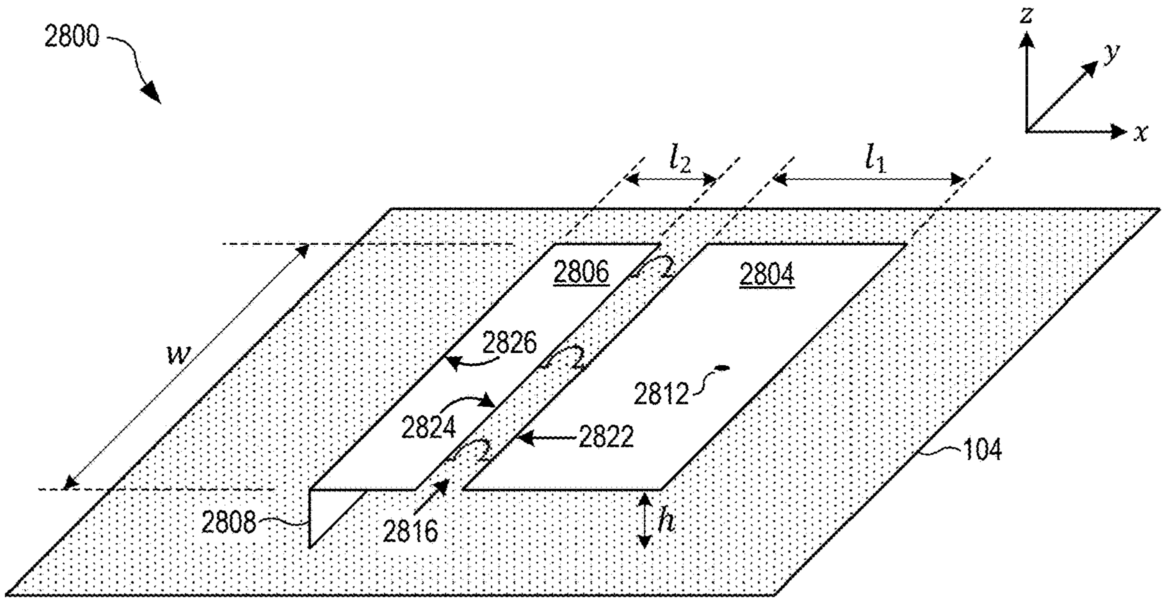
FIG. 28 is a perspective view of an air-loaded quarter-wave microstrip patch antenna that includes a shorting strip, in an embodiment.

FIG. 28 is a perspective view of an air-loaded quarter-wave microstrip patch antenna 2800. The patch antenna 2800 may be used, for example, as part of a planar inverted-F antenna (PIFA) whose footprint is reduced compared to a conventional PIFA of the same resonant frequency. The patch antenna 2800 includes a first patch 2804 and a second patch 2806 that are coplanar, parallel to the counterpoise 104, and vertically displaced (i.e., along the +z direction) from the counterpoise 104 by the gap height h. The patches 2804 and 2806 are spaced apart along x to create an electrically insulating space 2816 therebetween. Located in the space 2816 is at least one reactive element (e.g., the reactive element 1004) that electrically connects to both of the patches 2804 and 2806. In the example of FIG. 28, the reactive elements are three planar inductors (see FIG. 11) that are coplanar with the patches 2804 and 2806. A different number of reactive elements may be used to electrically connect to the patches 2804 and 2806 (e.g., one, two, four, eight, etc.). While FIG. 28 shows the reactive elements as planar inductors, the reactive elements may alternatively be any combination of planar inductors, planar capacitors, non-planar inductors, and non-planar capacitors. The patch antenna 2800 is driven via a feed 2812 that connects to an interior of the first patch 2804. However, the patch antenna 2800 may be driven using another feeding technique known in the art.

In FIG. 28, the patches 2804 and 2806 are shaped as rectangles with the same width w and lengths $l_1$ and $l_2$, respectively. The lengths $l_1$ and $l_2$ may be different (e.g., $l_1<l_2$, as shown in FIG. 28) or the same. The first patch 2804 has a first edge 2822 that is closest to the second patch 2806 and the second patch 2806 has a second edge 2824 that is closest to the first patch 2804. The edges 2822 and 2824 are parallel and displaced from each other along x by the inductor length $l_1$ (see FIG. 11) to form the space 2816. Together, the patches 2804 and 2806 form a rectangle of width w and total length $l=l_1+l_2+l_1$. However, the patches 2804 may have different shapes and positions than shown.

The second patch 2806 also has a third edge 2826 that is opposite to the second edge 2824. The patch antenna 2800 also includes a shorting strip 2808 that electrically shorts the third edge 2826 to the counterpoise 104. In the example of FIG. 28, the shorting strip 2808 is a rectangle with dimensions of w and h, and therefore the shorting strip 2808 spans the full width of the third edge 2826. However, the shorting strip 2808 may have a different size, shape, or orientation than shown. Alternatively, the third edge 2826 may be shorted to the counterpoise 104 using one or more electrically conducting pins or vias. A linear sequence of such pins or vias extending along y may be used to approximate the shorting strip 2808.

More generally, the patch antenna 2800 may include a linear sequence of n≥2 patches such that (i) each patch forms a space with each of its nearest neighbors and (ii) one or more reactive elements are located within each space and electrically connect to each of the nearest-neighbor patches forming the space. The antenna element 1000 of FIG. 10 is one example of such a sequence for n=3. Similarly, FIG. 17 shows one example of such a sequence for n=4. The distal widthwise edge of the last patch of the sequence may then be grounded using the shorting strip 2808, one or more pins, one or more vias, or a combination thereof.

Figure 29:
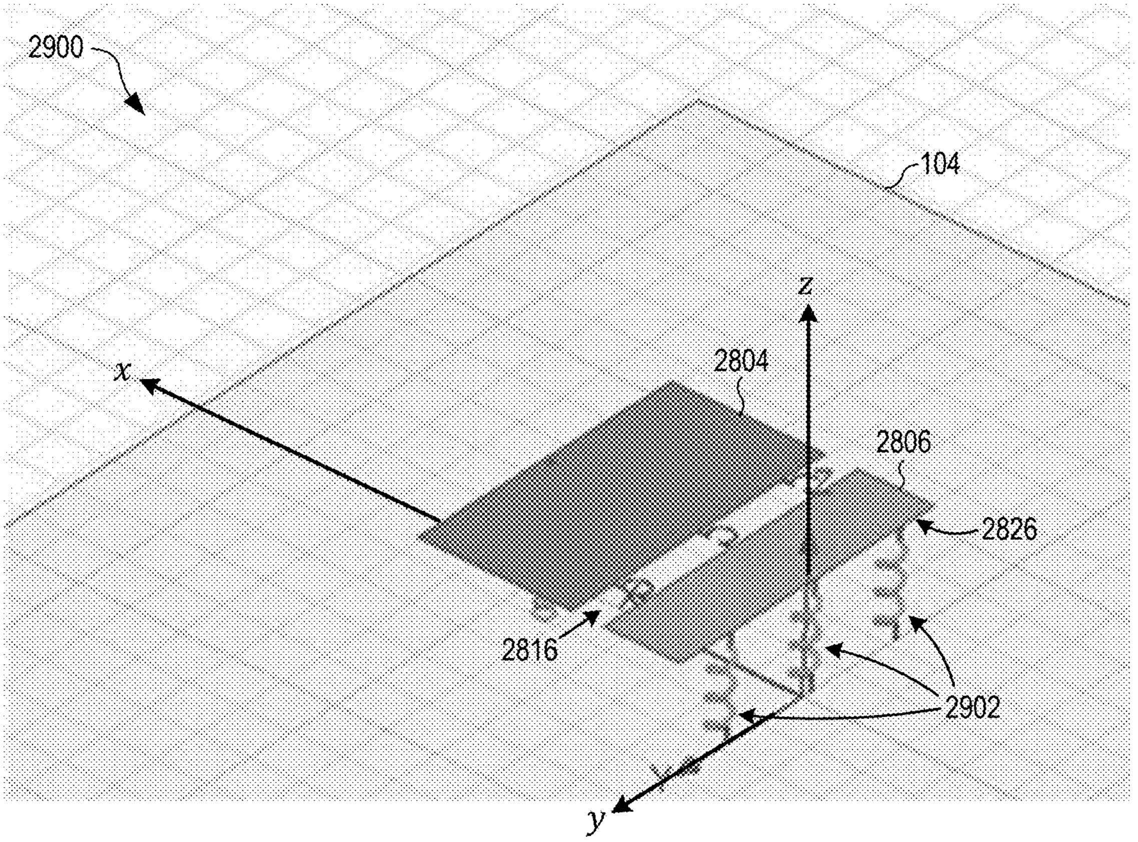
FIG. 29 is a perspective view of an air-loaded quarter-wave microstrip patch antenna that is similar to the patch antenna of FIG. 28 except that the shorting strip has been replaced with one or more non-planar discrete reactive components, in an embodiment.

FIG. 29 a perspective view of an air-loaded quarter-wave microstrip patch antenna 2900 that is similar to the patch antenna 2800 of FIG. 28 except that the shorting strip 2808 has been replaced with one or more non-planar discrete reactive components 2902. In FIG. 29, the reactive components 2902 are shown as coils, each of which electrically shuts the edge 2802 to the counterpoise 104 . . . . However, one or more of the reactive components 2902 may alternatively be planar (e.g., see FIG. 11). While FIG. 29 shows three reactive components 2902 uniformly spaced along y, the patch antenna 2900 may include any number of reactive components 2902 (e.g., one, two, three, four, etc.), and these reactive components 2902 may be distributed along y in any way. The number, type (i.e., capacitor versus inductor), reactances, and locations of the reactive components 2902 may be selected based on the application at hand, and therefore may be different than shown in FIG. 29 without departing from the scope hereof.

Figure 30:
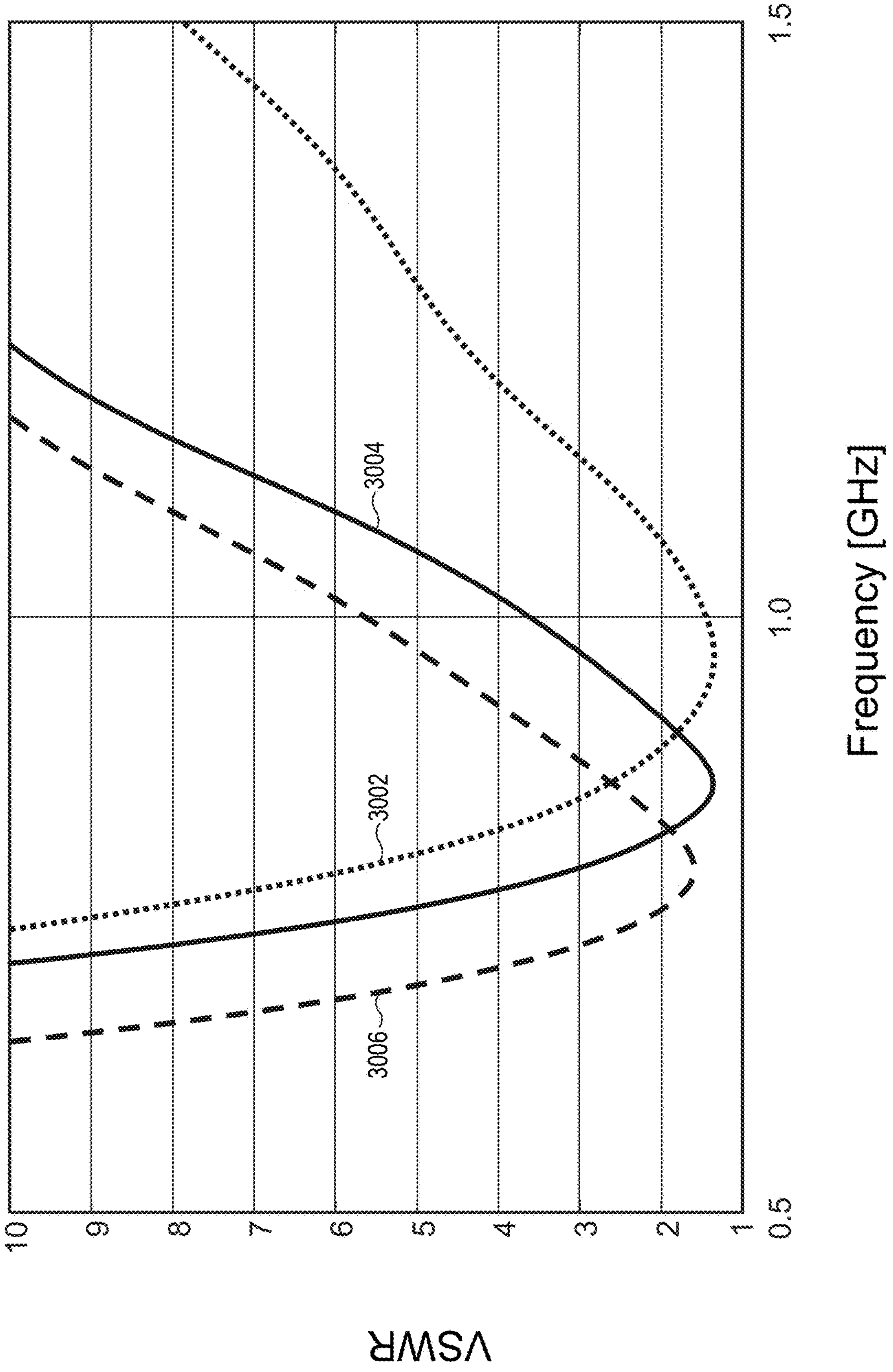
FIG. 30 is a plot of the simulated impedance responses of a conventional quarter-wave air-loaded patch antenna, the air-loaded quarter-wave microstrip patch antenna of FIG. 28, and the air-loaded quarter-wave microstrip patch antenna of FIG. 29.

FIG. 30 is a plot of the simulated impedance responses of a conventional quarter-wave air-loaded patch antenna (see the curve 3002), the air-loaded quarter-wave microstrip patch antenna 2800 of FIG. 28 (see the curve 3004), and the air-loaded quarter-wave microstrip patch antenna 2900 of FIG. 29 (see the curve 3006). To create the plot of FIG. 30, it was assumed that the simulated patch antennas have the same width w, length l, counterpoise 104, and gap height h. The conventional quarter-wave patch antenna is therefore similar to the patch antenna 2800 except that the spacing 2816 is filled with the same electrically conductive material of the patches 2804 and 2806. The plot of FIG. 30 shows that the inductance introduced by the reactive elements 2902 lowers the resonant frequency, thereby allowing the patch antenna 2900 to have a smaller footprint than the patch antenna 2800 (for the same resonant frequency).

Any patch antenna of the present embodiments that uses areal loading (e.g., the patch antenna 1200, 1700, 2300, 2400, 2600, 2800, 2900, etc.) may be combined with one or more additional techniques to further reduce its footprint. For example, the patch antenna can be loaded with a dielectric material having a relative permittivity $\epsilon_r$ greater than that of air or any other magnetodielectric material illustrated in FIG. 5. Additionally or alternatively, the patch antenna may be combined with the discrete shunt capacitive loading shown in FIGS. 6A and 6B.

Figure 31:
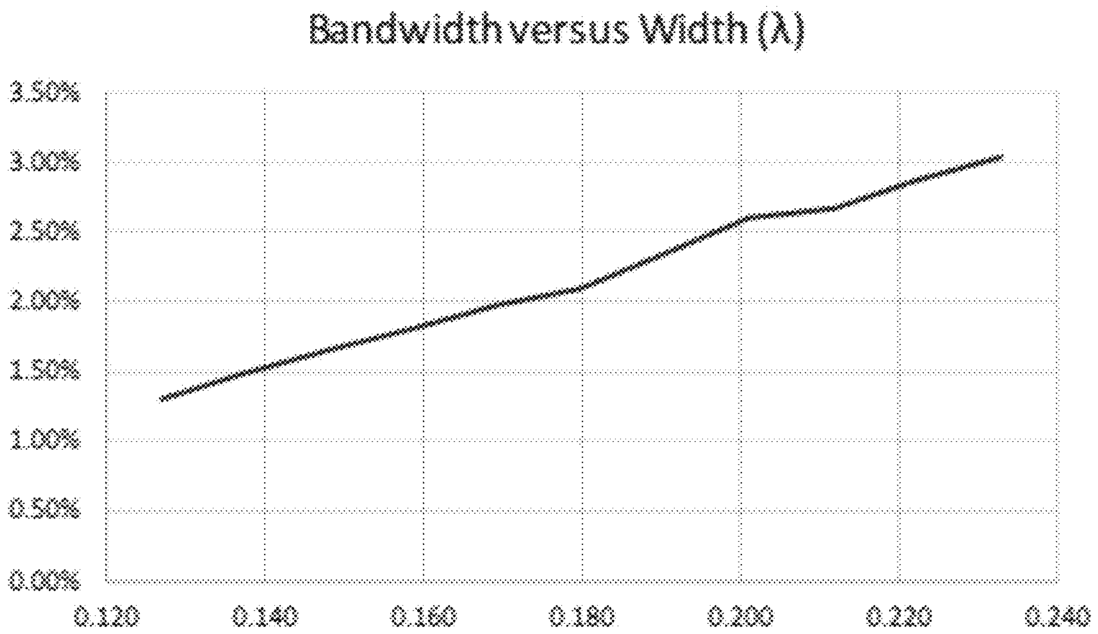
FIG. 31 is a plot of bandwidth versus width of the conventional patch antenna of FIG. 1.
Figure 32:
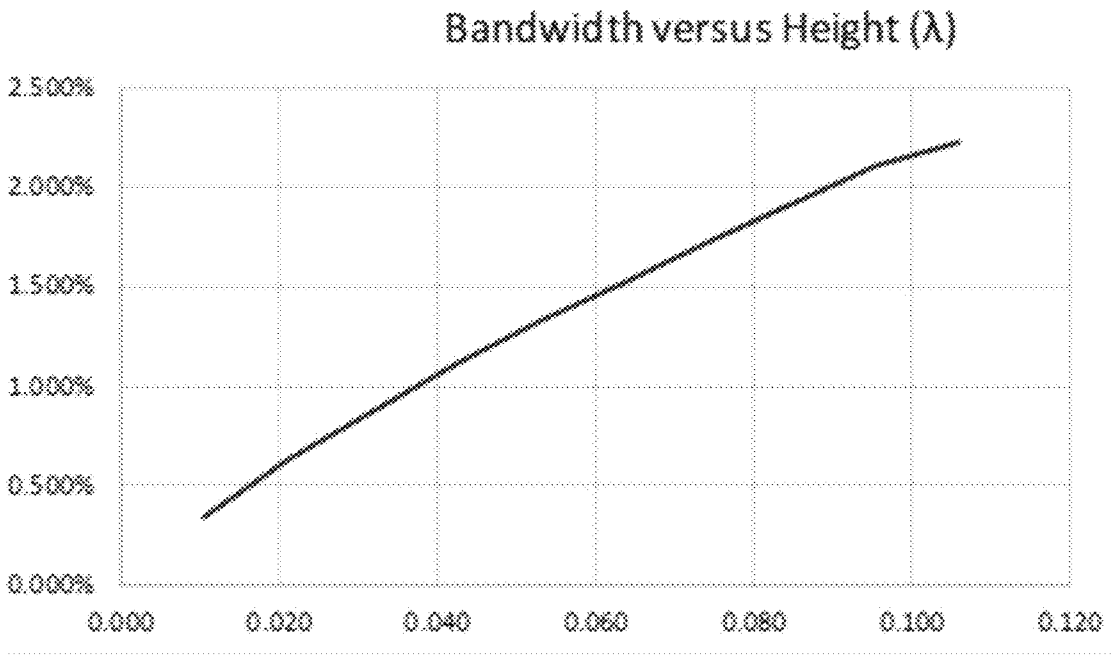
FIG. 32 is a plot of bandwidth versus gap height of the conventional patch antenna of FIG. 1.

FIG. 31 is a plot of bandwidth versus width w of the conventional patch antenna 100 of FIG. 1. In FIG. 31, the gap height was assumed to be h=0.0531. FIG. 32 is a plot of bandwidth versus gap height h of the conventional patch antenna 100. In FIG. 32, the width w was assumed to be w=0.1911. FIGS. 31 and 32 show how the bandwidth scales (approximately) linearly with the height h and width w. Thus, these two parameters can be adjusted to achieve a target bandwidth. While FIGS. 31 and 32 were simulated for the conventional patch antenna 100 of FIG. 1, it can be assumed that these linear relationships will also hold for any patch antenna of the present embodiments.

As an example of how FIGS. 31 and 32 may be used, consider first and second patch antennas designed with two different loading techniques. The first patch antenna may have a mass of only 10% of that of the second patch antenna, and a bandwidth of 80% of that of the second patch antenna. In this case, it might be useful to increase one or both of the width w and gap height h by ~25% such that the first patch antenna has the same bandwidth as the second patch antenna. Increasing the width w and gap height h of the first patch antenna will increase its mass, thereby introducing a tradeoff between size, weight, and bandwidth that can be evaluated and optimized for the application at hand.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A patch antenna element, comprising:

a plurality of radiating patches that are coplanar, each of the plurality of radiating patches having a length along a resonant dimension of the patch antenna element, the length being no greater than one-half of a wavelength of a maximum operating frequency of the patch antenna element; and one or more passive inductors;

wherein for each pair of neighboring patches of the plurality of radiating patches:

the pair of neighboring patches forms an electrically insulating space therebetween;

at least one passive inductor of the one or more passive inductors lies within the electrically insulating space; and each passive inductor of the at least one passive inductor is directly electrically connected to both of the pair of neighboring patches such that no circuit element is electrically connected between the passive inductor and each of the pair of neighboring patches;

wherein the patch antenna element is disposed above a counterpoise and has a smaller footprint than a conventional single-patch half-wave air-loaded patch antenna sized to resonate at the maximum operating frequency.

2. The patch antenna element of claim 1, wherein for each pair of neighboring patches:

a first patch of the pair of neighboring patches has a first edge nearest a second patch of the pair of neighboring patches; and the second patch has a second edge that is nearest the first patch, parallel to the first edge, and displaced from the first edge to create the electrically insulating space.

3. The patch antenna element of claim 2, wherein:

the first edge is parallel to a first radiating edge of the plurality of patches; and the second edge is parallel to a second radiating edge of the plurality of patches.

4. The patch antenna element of claim 2, wherein for each pair of neighboring patches, the at least one passive inductor comprises a plurality of passive inductors that are uniformly spaced along a direction parallel to the first and second edges.

5. The patch antenna element of claim 1, each of the one or more passive inductors being a planar inductor that is coplanar with the plurality of radiating patches.

6. The patch antenna element of claim 1, the one or more passive inductors including a planar inductor.

7. The patch antenna element of claim 1, the plurality of radiating patches being identically shaped and regularly spaced along the resonant dimension.

8. The patch antenna element of claim 1, the plurality of radiating patches being identically shaped and regularly spaced along (i) the resonant dimension and (ii) a dimension that is perpendicular to the resonant dimension and parallel to a plane of the plurality of radiating patches.

9. The patch antenna element of claim 1, wherein:

the plurality of radiating patches includes a first patch and a second patch; and the second patch fully surrounds the first patch in a plane of the plurality of radiating patches.

10. A patch antenna comprising:

the patch antenna element of claim 1; and the counterpoise of claim 1, the counterpoise being parallel to the patch antenna element and at least partially underneath the patch antenna element.

11. The patch antenna of claim 10, further comprising a substrate between the patch antenna element and the counterpoise;

wherein the patch antenna element is located on a first side of the substrate and the counterpoise is located on a second side of the substrate that is opposite to the first side.

12. The patch antenna of claim 11, the substrate comprising one or more layers of a printed circuit board.

13. The patch antenna of claim 10, further comprising a feed that electrically connects to one of the plurality of radiating patches.

14. The patch antenna of claim 10, further comprising:

a first feed electrically connecting to a first patch of the plurality of radiating patches; and a second feed electrically connecting to a second patch of the plurality of radiating patches, the second patch being different from the first patch;

wherein:

the patch antenna, when driven via the first feed, emits radiation polarized in a first direction; and the patch antenna, when driven via the second feed, emits radiation polarized in a second direction that is perpendicular to the first direction.

15. The patch antenna of claim 10, further comprising a magnetodielectric material at least partially located between the patch antenna element and the counterpoise.

16. The patch antenna of claim 10, wherein a gap between the patch antenna element and the counterpoise is filled with air.

17. The patch antenna of claim 10, one of the plurality of radiating patches having a distal widthwise edge that is electrically shorted to the counterpoise.

* * * * *